US009938920B2

(12) United States Patent
Idogawa

(10) Patent No.: US 9,938,920 B2
(45) Date of Patent: Apr. 10, 2018

(54) ELECTRONIC CONTROL UNIT OF INTERNAL COMBUSTION ENGINE AND METHOD THEREOF

(71) Applicant: TOYOTA JIDOSHA KABUSHIKI KAISHA, Toyota-shi, Aichi-ken (JP)

(72) Inventor: Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 14/776,224

(22) PCT Filed: Mar. 13, 2014

(86) PCT No.: PCT/IB2014/000310

§ 371 (c)(1),
(2) Date: Sep. 14, 2015

(87) PCT Pub. No.: WO2014/140737

PCT Pub. Date: Sep. 18, 2014

(65) Prior Publication Data

US 2016/0032851 A1 Feb. 4, 2016

(30) Foreign Application Priority Data

Mar. 14, 2013 (JP) ................................ 2013-052114

(51) Int. Cl.
*G06F 19/00* (2011.01)
*F02D 41/14* (2006.01)
(Continued)

(52) U.S. Cl.
CPC ......... *F02D 41/1401* (2013.01); *F02D 41/06* (2013.01); *F02D 41/1497* (2013.01);
(Continued)

(58) Field of Classification Search
CPC .. F02D 41/1401; F02D 41/06; F02D 41/1497; F02D 41/3076; F02D 2041/1418; F02D 2041/1433
(Continued)

(56) References Cited

U.S. PATENT DOCUMENTS 7,657,416 B1 * 2/2010 Subasic ............... G06F 17/5045 703/13
8,332,122 B2 * 12/2012 Tanaka ............... F02D 41/1401 701/101
(Continued)

FOREIGN PATENT DOCUMENTS

EP 2180169 A1 4/2010
EP 2180170 A1 4/2010
(Continued)

*Primary Examiner* — Hung Q Nguyen
*Assistant Examiner* — Anthony Taylor, Jr.
(74) *Attorney, Agent, or Firm* — Oliff PLC

(57) ABSTRACT

An electronic control unit of the present invention includes: a demand generation level that generates and outputs a demand value concerning various kinds of functions; a physical quantity mediation level that aggregates and mediates the demand value for each predetermined physical quantity; and a controlled variable setting level that sets a controlled variable of the actuator based on the mediated demand value and transmits a signal in a single direction from a higher level to a lower level. A controlled variable mediation level that aggregates and mediates demand values expressed with controlled variables of the actuators set on the controlled variable setting level and a demand value transmitted from the demand generation level not through the physical quantity mediation level, together with demand values mediated by the physical quantity mediation level is provided below the controlled variable setting level.

9 Claims, 8 Drawing Sheets

(51) Int. Cl.
*F02D 41/30* (2006.01)
*F02D 41/06* (2006.01)
*F02D 41/26* (2006.01)

(52) U.S. Cl.
CPC ....... *F02D 41/263* (2013.01); *F02D 41/3076* (2013.01); *F02D 2041/1418* (2013.01); *F02D 2041/1433* (2013.01)

(58) Field of Classification Search
USPC .......................................................... 701/102
See application file for complete search history.

(56) References Cited

U.S. PATENT DOCUMENTS

| | | | | |
|---|---|---|---|---|
| 8,903,624 | B2 * | 12/2014 | Yoshizaki ............. F02D 11/105 701/102 | |
| 2008/0140283 | A1 | 6/2008 | Kuwahara et al. | |
| 2010/0191406 | A1 | 7/2010 | Tanaka et al. | |
| 2010/0198485 | A1 * | 8/2010 | Ohtsuka ................ F02D 11/105 701/103 | |
| 2011/0098905 | A1 * | 4/2011 | Ueda ....................... F02D 37/02 701/102 | |
| 2011/0106399 | A1 | 5/2011 | Asano et al. | |
| 2011/0144885 | A1 * | 6/2011 | Ohtsuka ................ F02D 11/105 701/102 | |

FOREIGN PATENT DOCUMENTS

| | | | |
|---|---|---|---|
| EP | 2317106 | A1 | 5/2011 |
| JP | 06-022544 | U | 3/1994 |
| JP | 2001-323863 | A | 11/2001 |
| JP | 2002-276449 | A | 9/2002 |
| JP | 2005-009398 | A | 1/2005 |
| JP | 2007-154788 | A | 6/2007 |
| JP | 2009-047101 | A | 3/2009 |
| JP | 2009-047102 | A | 3/2009 |
| JP | 2010-053705 | A | 3/2010 |
| JP | 2010-513138 | A | 4/2010 |
| JP | 2011-094588 | A | 5/2011 |
| WO | 2007049784 | A1 | 5/2007 |
| WO | 2008079003 | A1 | 7/2008 |
| WO | 2009087844 | A2 | 7/2009 |

* cited by examiner

ELECTRONIC CONTROL UNIT OF INTERNAL COMBUSTION ENGINE AND METHOD THEREOF

1. FIELD OF THE INVENTION

The present invention relates to an electronic control unit for achieving demands concerning various kinds of functions of an internal combustion engine by coordinative control of a plurality of actuators and a control method thereof.

2. DESCRIPTION OF RELATED ART

As disclosed in, for example, Japanese Patent Application Publication No. 2009-47101 (JP 2009-47101 A) and Japanese Patent Application Publication No. 2009-47102 (JP 2009-47102 A), there have been known electronic control units for the internal combustion engine including a hierarchical control structure in which a signal is transmitted in a single direction from a higher level to a lower level. In the examples described in the aforementioned respective literatures, a demand value expressed with three kinds of physical quantities is generated from a demand about fundamental three functions in the internal combustion engine on the highest demand generating level. The internal combustion engine is a vehicle internal combustion engine. The fundamental three functions are drivability, exhaust gas and fuel consumption and the three physical quantities are torque, efficiency and air-fuel ratio.

A signal of a demand value generated on the highest demand generation level is transmitted to a lower physical quantity mediation level. Here, the signals of the aforementioned demand values are aggregated to each physical quantity of torque, efficiency and air-fuel ratio. Then, according to a predetermined rule, the demand value aggregated to each of torque, efficiency and air-fuel ratio is mediated to a single demand value. The mediated demand value signal of each of torque, efficiency and air-fuel ratio is transmitted to a lower controlled variable setting level. On the controlled variable setting level, each demand value is adjusted based on a relationship between respective demand values, and according to the adjusted demand value, a controlled variable for an actuator is determined.

In this way, the demand for the internal combustion engine can be expressed with three kinds of physical quantities including torque, efficiency and air-fuel ratio, and mediated. By mediating the demand for the internal combustion engine as described above, an operation of the entire internal combustion engine which should be achieved by controlling the internal combustion engine is determined regardless of the characteristic and kind of an actuator, so that a preferable control which satisfies the fundamental demands about drivability, exhaust gas and fuel consumption of the internal combustion engine can be achieved.

SUMMARY OF THE INVENTION

During an operation of the internal combustion engine, the operating state is often changed corresponding to a demand with a high urgency such as fail safe, part protection. In such a case, a processing for the internal combustion engine control must be performed as quickly as possible. However, if a controlled variable of the actuator is set after the demand with a high urgency is replaced with a demand value such as the torque, efficiency or air-fuel ratio temporarily and mediated, an extra arithmetic operation load occurs which is disadvantageous for the quick processing of the internal combustion engine control.

The reason is as follows. For example, in case for controlling the amount of intake air to prevent a rise in engine speed, controlling of an opening amount of a throttle (controlled variable of throttle actuator) is a simple measure. However, a limit value of the throttle opening amount is converted to a torque temporarily on the physical quantity mediation level and the converted torque is mediated together with other demands. Then, the throttle opening amount must be calculated again based on this mediated torque.

Furthermore, the demand from the internal combustion engine is sometimes made under only a specific condition other than a regular operation condition of the internal combustion engine. The specific condition includes, for example, a startup time of the internal combustion engine, a stop time of the internal combustion engine and an on-board-diagnostic time (OBD) of the internal combustion engine. This demand is also simply expressed with a sequence for controlling a throttle opening amount, an amount of fuel injection and ignition timing. Thus, a meaning that the aforementioned demand is expressed with a combination of torque, efficiency and air-fuel ratio and then mediated is small, so that an extra arithmetic operation load occurs like the aforementioned fail safe.

Furthermore, if the internal combustion engine is a cylinder injection internal combustion engine in which fuel is injected directly into a combustion chamber in the cylinder, the freedom of injection control is high. Thus, if the internal combustion engine is a cylinder injection internal combustion engine, there may be a demand for changing injection timing or injection frequency as required to form an excellent fuel-air mixture in the cylinder The injection timing and injection frequency mean just an operation of an injector, that is, a controlled variable of the injector. Thus, setting the controlled variable of the injector directly as a controlled variable produces a lighter arithmetic operation load than expressing the controlled variable of the injector with physical quantity including torque, efficiency or air-fuel ratio.

In views of the above-described problems, an object of the present invention is to provide an electronic control unit with a hierarchical structure which satisfies fundamental demands for the internal combustion engine at an excellent balance by mediating the physical quantities, in which preferably a demand not suitable for mediation of the physical quantity can be achieved without increasing the arithmetic operation load for the control.

To achieve the above-described object, the present invention provides an electronic control unit which aggregates and mediates a demand value of a signal transmitted from the demand generation level not through the physical quantity mediation level for each of the controlled variables to determine an actuator controlled variable, and a method thereof.

According to a first aspect of the present invention, there is provided an electronic control unit for an internal combustion engine configured to achieve demands concerning various kinds of functions of the internal combustion engine by coordinative control of a plurality of actuators concerning an operation of the internal combustion engine. The electronic control unit has a hierarchical control structure which includes the demand generation level, the physical quantity mediation level, the controlled variable setting level and the controlled variable mediation level. The demand generation level generates and outputs a demand values concerning the functions of the internal combustion engine. The physical quantity mediation level is provided just below the demand generation level, and the physical quantity mediation level aggregates and mediates demand values expressed with predetermined physical quantities of the demand values. The controlled variable setting level is provided just below the physical quantity mediation level and the controlled variable setting level sets controlled variables of the actuators based on the mediated demand values. The controlled variable mediation level is provided just below the controlled variable setting level. The demand values expressed with the controlled variables of the actuators of the demand values output from the demand generation level are transmitted to the controlled variable mediation level not through the physical quantity mediation level. And the controlled variable mediation level aggregates and mediates demand values expressed with controlled variables of the actuators set on the controlled variable setting level and the demand values expressed with the controlled variables of the actuators of the demand values which are transmitted to the controlled variable mediation level not through the physical quantity mediation level for each of the controlled variables. Of the demand values output from the demand generation level, the demand values expressed with the controlled variables of the actuators are transmitted to the controlled variable mediation level not through the physical quantity mediation level. The demand values output from the demand generation level are transmitted in a single direction from a higher level to a lower level in order of the demand generation level, the physical quantity mediation level and the controlled variable setting level.

In the electronic control unit, the demands output from the demand generation level that is the highest level of the hierarchical control structure are transmitted in a single direction in order of the lower physical quantity mediation level then, the further lower controlled variable setting level and the still further lower controlled variable mediation level. Thus, exchanging signals between a higher level and a lower level does not occur thereby reducing the arithmetic operation load for the control.

The demand values concerning various kinds of functions of the internal combustion engine are expressed with a predetermined physical quantities (e.g., torque, efficiency, air-fuel ratio) and the demands expressed with physical quantities are mediated. Because the controlled variables of each actuator are set based on this mediated demand values, the fundamental function demands (e.g., drivability, exhaust gas and fuel consumption) of the internal combustion engine are satisfied at an excellent balance by coordinative control of a plurality of the actuators.

Further, for example, fail safe demand, startup demand or a demand concerning the operation of an injector is expressed with the controlled variables of the actuators and transmitted from the demand generation level to the lower controlled variable mediation level not through the physical quantity mediation level or the controlled variable setting level. Then, because the demand values are aggregated and mediated for each of the controlled variables, demands about fail safe or the operation of the injector which are not suitable for physical quantity mediation are reflected on the control of the internal combustion engine.

That is, the demands concerning the various kinds of functions of the internal combustion engine are sorted to a suitable one of the physical quantity mediation and the actuator controlled variable mediation and processed. As a result, a preferable control which all the demands are reflected on can be achieved without increasing control arithmetic operation load.

Further, if a function for transmitting the demand directly to the controlled variable mediation level is added, it is not necessary to change control processing of the physical quantity mediation level or the controlled variable setting level. As a result, there is such an advantageous effect that portions which should be changed in the control program are a few thereby contributing to reduction of man-hours. Thus, demand for modification of the control specification can be met easily.

Here, on the controlled variable mediation level, the priority of the demands (signals) transmitted from the demand generation level to the controlled variable mediation level not through the physical quantity mediation level may be higher than the priority of the fundamental demands (demands transmitted through the physical quantity mediation level) for example, different from the fundamental demands which are required to be satisfied at an excellent balance during an operation of the internal combustion engine as described above. Further, the demands (signals) transmitted from the demand generation level to the controlled variable mediation level not through the physical quantity mediation level may be demands which are easier to express with the actuator controlled variable than with the physical quantity.

For example, a demand for fail safe or part protection has urgency. Thus, if such a demand occurs, the priority of this demand is higher than the priority of demands for drivability, exhaust gas or fuel consumption during a normal driving of a vehicle. Therefore, by expressing these demand values with the controlled variables of the actuators without replacing with the physical quantities temporarily for mediation and transmitting them directly to the controlled variable mediation level, occurrence of an extra arithmetic operation load can be prevented, thereby accelerating the processing.

Further, demands only under a specific situation such as startup demand, OBD demand have a high priority, and often they are easier to express with the actuator control sequence than with the physical quantity. Thus, these demand values may be expressed with the controlled variables of the actuators without being replaced with the physical quantities temporarily for mediation and transmitted directly to the controlled variable mediation level Further, injection timing and injection frequency of fuel in the cylinder injection type internal combustion engine may be expressed with the controlled variable of the injector as it is, and transmitted directly to the controlled variable mediation level. As a result, an excess arithmetic operation load can be prevented.

Then, an order of priority may be set preliminarily to each demands (signals) on the demands of the demand values transmitted from the demand generation level to the controlled variable mediation level not through the physical quantity mediation level and those demands may be mediated by considering such an order of priority on the controlled variable mediation level. As a result, while demands with a high priority are reflected on the control sufficiently, demands with a low priority can be reflected appropriately.

According to a first aspect of the present invention, the demand generation level may include a first demand output portion and a second demand output portion. The first demand output portion expresses demand values concerning the functions of the internal combustion engine with the physical quantities and outputs the expressed demand values. And the second demand output portion expresses demand values concerning the functions of the internal combustion engine with the controlled variables of the actuators and outputs the expressed demand values, the first demand output portion and the second demand output portion being provided for each of the functions. The physical quantity mediation level may include a physical quantity mediation portion for each of the physical quantities, each physical quantity mediation portion existing for each physical quantities being configured to aggregate the demand values of the physical quantities of which that physical quantity mediation portion is charge of demand values output from the demand output portion and mediating to a single demand value. The controlled variable setting level may adjust each demand value mediated by the physical quantity mediation portion based on a relationship between respective demand values mediated by the physical quantity mediation portions and set the controlled variables for each of the plurality of the actuators.

The various kinds of the functions of the internal combustion engine include drivability function, exhaust gas function and fuel consumption function, which are fundamental demands which should be satisfied at an excellent balance during an operation of the internal combustion engine. On the other hand, as the output of the internal combustion engine, torque, heat and exhaust gas can be mentioned, and the parameters for controlling these outputs can be aggregated to three kinds of physical quantities, such as torque, efficiency and air-fuel ratio. Therefore, the demands concerning the functions of the internal combustion engine may be expressed with three physical quantities, such as torque, efficiency and air-fuel ratio.

In the meantime, the demand concerning drivability can be expressed with for example, torque or efficiency. The demand concerning exhaust gas can be expressed with efficiency or air-fuel ratio, for example. The demand concerning fuel consumption can be expressed with efficiency or air-fuel ratio, for example.

On the other hand, as the plural actuators which the internal combustion engine has, in case of spark ignition type internal combustion engine, for example, a throttle valve for adjusting intake air amount, an igniter for adjusting an ignition timing, an injector for adjusting fuel injection amount, and a fuel pump for supplying fuel to this injector can be mentioned. The reason is that the demands concerning each function of the internal combustion engine can be achieved easily by controlling the intake air amount, ignition timing and fuel injection amount.

Although the controlled variables for those actuators are basically aggregated and mediated for each actuator, the controlled variable mediation level may include an integrated mediation portion which mediates the controlled variables of two or more actuators integrally by correlating them with each other. To mediate the plural actuators integrally, they may be mediated in the same processing step of the control program, for example. As a result, simultaneity of the mediation of the controlled variables of two or more actuators can be secured.

For example, if the injector for injecting fuel into the internal combustion engine and the fuel pump for supplying fuel to this injector are included in the plural actuators, the integrated mediation portion may be an injection function mediation portion that mediates the controlled variables of the injector and the controlled variables of the fuel pump by correlating the controlled variables with each other. As a result, simultaneity in control of the injection amount, injection timing and fuel pressure which affect largely formation and combustibility of fuel-air mixture in the combustion chamber can be secured, so as to achieve formation of excellent fuel-air mixture securely.

As an example, when mediating the controlled variables of the injector to stop the operation of the injector, the injection function mediation portion may be mediate the controlled variables of the fuel pump to stop the operation of the fuel pump by relating to mediating the controlled variables of the injector to stop the operation of the injector. As a result, when stopping an operation of the internal combustion engine automatically with a stop of a vehicle, for example, the operation of the fuel pump is stopped at the same time when the fuel injection is stopped. Consequently, driving loss of the pump can be reduced thereby improving fuel consumption performance.

Further, according to the first aspect of the present invention, if the injector injects fuel directly into a combustion chamber in a cylinder of the internal combustion engine and the fuel pump is a high-pressure pump that supplies the injector with fuel with a higher pressure than a predetermined level, the injection function mediation portion may mediate the controlled variables of the high-pressure pump to increase the pressure of fuel with the high-pressure pump by relating to mediating the controlled variable of the injector, when mediating the controlled variables of the injector to operate the injector in a compression stroke of the cylinder of the internal combustion engine.

As a result, when injecting fuel in the compression stroke in which the pressure in the cylinder is increased, the fuel pressure can be increased with the high-pressure pump thereby achieving formation of excellent fuel-air mixture. On the other hand, when injecting no fuel in the compression stroke, the fuel pressure is lowered relatively to reduce pump driving loss and improve fuel consumption performance.

In addition, according to the first aspect of the present invention, if the plurality of the actuators includes an igniter that adjusting the ignition timing of the internal combustion engine, the controlled variable mediation level may include an ignition timing mediation portion that mediates the ignition timing to be adjusted by the igniter and an ignition cut mediation portion that the controlled variables to stop ignition by the igniter separately from the ignition timing mediation portion.

As a result, to accelerate processing for stopping ignition corresponding to a demand concerning fail safe or part protection, only the speed of the arithmetic processing in the ignition cut mediation portion different from the ignition timing mediation portion must be accelerated. Consequently, the arithmetic operation load can be reduced compared to accelerating the speed of the arithmetic processing in the ignition timing mediation portion.

Likewise, according to the first aspect of the present invention, if the plurality of the actuators includes an injector for injecting fuel into the internal combustion engine, the controlled variable mediation level may include an injector control mediation portion that mediates the controlled variables of the injector and an injection cut mediation portion that mediates the controlled variables to stop the operation of the injector separately from the injector control mediation portion.

Acceleration of the processing for stopping the fuel injection corresponding to a demand about fail safe in this way can be achieved by only accelerating the arithmetic processing of the injection cut mediation portion separately from the injector control mediation portion. Thus, the above-described configuration can reduce the arithmetic operation load compared to acceleration of the arithmetic processing of the injector control mediation portion and the injection cut mediation portion. By accelerating the arithmetic processing of the injection cut mediation portion, the processing for restarting the fuel injection after the fuel injection is stopped temporarily is accelerated, which is advantageous for prevention of engine stall.

According to the present invention, the control arithmetic operation load can be reduced by transmitting signals in a single direction from the demand generation level to the lower physical quantity mediation level, controlled variable setting level and controlled variable mediation level. Further, by expressing the fundamental function demands of the internal combustion engine such as drivability, exhaust gas and fuel consumption with physical quantities and mediating them on the physical quantity mediation level, a preferable control in which the fundamental demands are satisfied at an excellent balance can be achieved.

Further, by transmitting and mediating the demands concerning fail safe, startup or the operation of the injector to the controlled variable mediation level not through the physical quantity mediation level, the demands concerning various kinds of the functions of the internal combustion engine can be preferably achieved without increasing the control arithmetic operation load excessively. That is, by sorting the demands to a suitable mediation for the physical quantity mediation and the controlled variable mediation for the processing, the demands concerning various kinds of the functions of the internal combustion engine can be preferably achieved without increasing the control arithmetic operation load excessively.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the present invention will be described with reference to the accompanying drawings. The embodiments will be described about cases in which the electronic control unit of the present invention has been applied to an internal combustion engine (hereinafter referred to as engine) loaded on a vehicle, particularly to cases in which it is applied to a spark ignition type engine.

Figure 1:
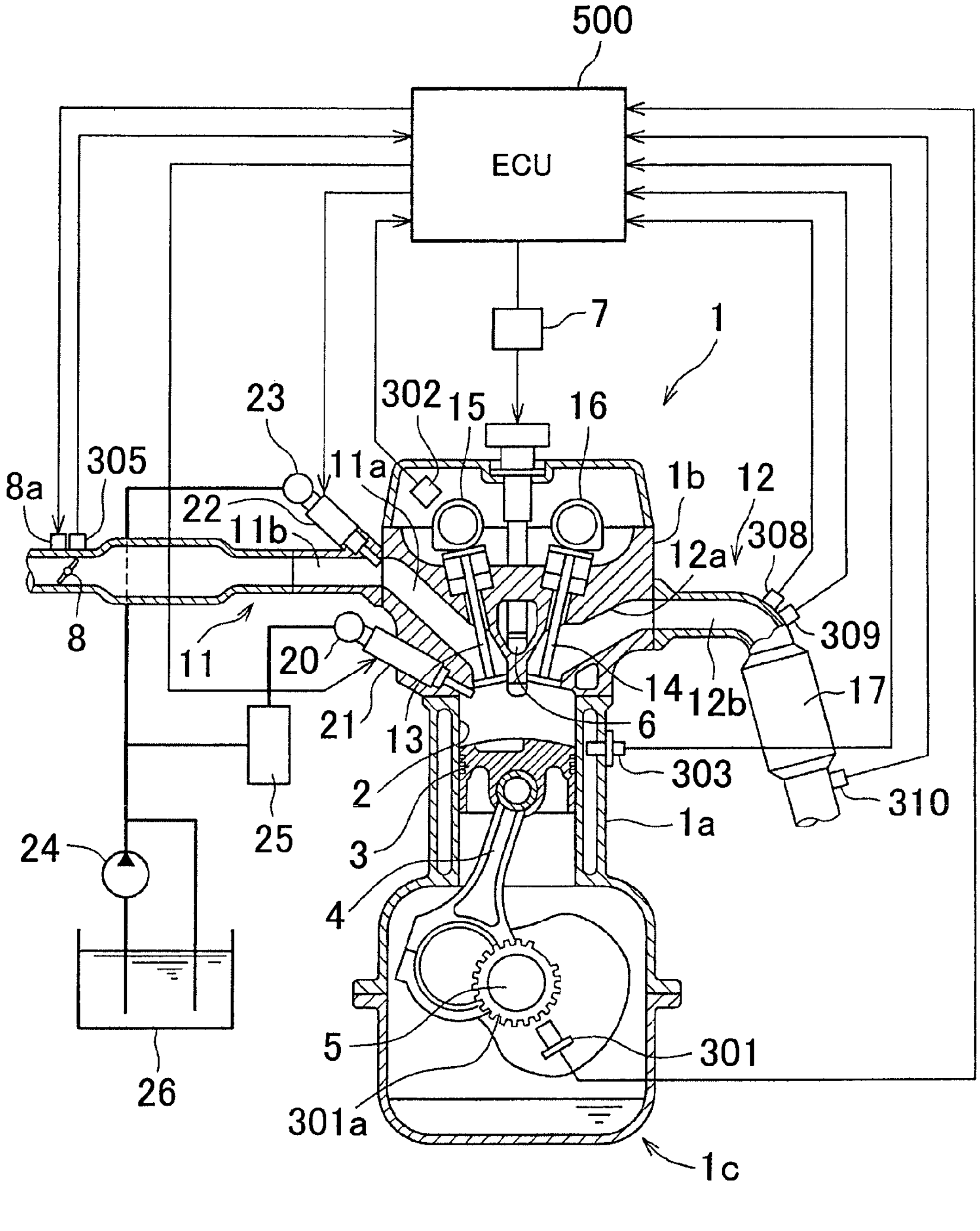
FIG. 1 is a configuration diagram showing an example of an internal combustion engine according to an embodiment of the present invention.

Hereinafter, referring to FIG. 1, an example of the structure of the spark ignition type engine 1 according to an embodiment will be described. Although FIG. 1 illustrates only a structure of a cylinder 2 in the main body of the engine 1, the engine 1 has a plurality of cylinders like, for example, an in-line four-cylinder engine. A piston 3 is accommodated in the cylinder 2 formed in a cylinder block 1*a* such that it reciprocates in a vertical direction in FIG. 1. A cylinder head 1*b* is mounted on the top of the cylinder block 1*a*, so that a combustion chamber is produced between a bottom surface thereof and the top surface of the piston 3.

A piston 3 is connected to a crank shaft 5 via a connecting rod 4. The crank shaft 5 is accommodated in a crank case of a bottom portion of the cylinder block 1*a*. A rotor 301*a* is attached to the crank shaft 5. A crank position sensor 301 composed of an electromagnetic pickup, for example, is disposed near the side of the rotor 301*a*. When threads on the outer periphery of the rotor 301*a* pass, the crank position sensor 301 outputs a pulse signal. The engine speed can be calculated using the calculated pulse signal.

Further, a water jacket is formed to surround the cylinder 2 on the side wall of the cylinder block 1*a*. A water temperature sensor 303 is disposed in the water jacket to detect a temperature of engine cooling water w. The bottom portion of the cylinder block 1*a* is expanded downward in FIG. 1 to form an upper half of the crank case. An oil pan 1*c* is attached to the bottom of the cylinder block 1*a* to form a lower half of the crank case. Lubricant (engine oil) to be supplied to each part of the engine is stored in the oil pan 1*c*.

An ignition plug 6 is disposed on the cylinder head 1*b* such that it faces the combustion chamber in the cylinder 2. An electrode of the ignition plug 6 is supplied with a high voltage power from an igniter 7. Timing for supplying high voltage power to the ignition plug 6, namely, an ignition timing of the engine 1 is adjusted by the igniter 7. That is, the igniter 7 is an actuator which is capable of adjusting the ignition timing of the engine 1 and controlled by an electronic control unit (ECU) 500 described below.

An intake air port 11*a* and an exhaust air port 12*a* are formed in the cylinder head 1*b* such that they are open to the combustion chamber in the cylinder 2. An intake manifold 11*b* communicates with the intake air port 11*a*, so that the intake manifold 11*b* forms a downstream side of intake air flow through an intake air passage 11. An exhaust air manifold 12*b* communicates with an exhaust air port 12*a*, so that the exhaust air manifold 12*b* forms an upstream side of exhaust gas flow through an exhaust air passage 12.

An air flow meter 304 (see FIG. 2) for detecting an amount of intake air is disposed in the intake air passage 11. A throttle valve 8 for adjusting the amount of intake air is disposed on the downstream side thereof. An intake air temperature sensor 307 (see FIG. 2) for detecting the temperature of air (intake air temperature) before sucked by the engine 1 is also disposed in the intake air passage 11 (intake air manifold 11*b*).

In this example, the throttle valve 8 is disconnected mechanically from an accelerator, pedal (not shown) and driven by an electric throttle motor 8*a*. The opening amount of the throttle valve 8 is adjusted by the electric throttle motor 8*a*. A signal from the throttle opening amount sensor 305 which detects an opening amount of the throttle valve 8 is transmitted to the ECU 500 described below. The ECU 500 controls the throttle motor 8*a* to obtain a preferable amount of intake air depending on the operating state of the engine 1. That is, the throttle valve 8 is an actuator which adjusts the amount of intake air of the engine 1. The throttle valve 8 can be considered to be one of a plurality of actuators concerned with an operation of the internal combustion engine of the present invention.

The opening of the intake port 11*a* which faces the combustion chamber is opened/closed by the intake air valve 13. That is, the intake air passage 11 and the combustion chamber are connected or disconnected by the intake air valve 13. Likewise, the opening of the exhaust port 12*a* is opened/closed by the exhaust air valve 14. That is, the exhaust air passage 12 and the combustion chamber are connected or disconnected by the exhaust air valve 14. The opening/closing drive of the intake air valve 13 and the exhaust air valve 14 is carried out by an intake air camshaft 15 and an exhaust air camshaft 16 respectively. A rotation of the crank shaft is transmitted to the intake air camshaft 15 and the exhaust air camshaft 16 via a timing chain or the like.

In this example, a cam position sensor 302 is provided near the intake air camshaft 15. When the piston 3 of a specific cylinder 2 reaches its compression top dead center, the cam position sensor 302 generates a pulse signal. The cam position sensor 302 is constituted of an electromagnetic pickup, for example. Like the aforementioned crank position sensor 301, the cam position sensor 302 outputs a pulse signal with a rotation of a rotor provided on the intake air camshaft 15.

As an example, a catalyst 17 composed of three-way catalyst is disposed in the downstream of the exhaust air manifold 12*b* in the exhaust air passage 12. This catalyst 17 is an apparatus which oxidizes CO, HC in exhaust gas which is discharged from the combustion chamber in the cylinder 2 into the exhaust air passage 12 and reduces NOx to produce harmless $CO_2$, $H_2O$, $N_2$ thereby purifying exhaust gas.

In this example, an exhaust air temperature sensor 308 and an air-fuel (A/F) ratio sensor 309 are disposed in the exhaust air passage 12 on the upstream side of the catalyst 17. And an $O_2$ sensor 310 is disposed in the exhaust air passage 12 on the downstream side of the catalyst 17.

Next, a fuel injection system of the engine 1 will be described.

A cylinder injection injector 21 which injects fuel directly into each combustion chamber is disposed in each cylinder 2 of the engine 1. The cylinder injection injector 21 is connected to a high-pressure fuel delivery pipe 20. An intake port injection injector 22 which injects fuel into each intake port 11*a* is disposed in the intake air passage 11 of the engine 1. The intake port injection injector 22 is connected to a common low-pressure fuel delivery pipe 23.

A low-pressure pump 24 which is a fuel pump supplies fuel to the low-pressure fuel delivery pipe 23. A high-pressure pump 25 which is a fuel pump supplies fuel to the high-pressure fuel delivery pipe 20. Hereinafter, the low-pressure pump is also referred to as a fuel pump 24 and the high-pressure pump is also referred to as a fuel pump 25. Fuel in a fuel tank 26 is pumped by the low-pressure pump 24 and that fuel is supplied to the low-pressure fuel delivery pipe 23 and the high-pressure pump 25. Low-pressure fuel is pressurized up to a higher pressure than a predetermined level by the high-pressure pump 25 and the pressurized fuel is supplied to the high-pressure fuel delivery pipe 20.

A high-pressure fuel pressure sensor 311 (see FIG. 2) for detecting a pressure (fuel pressure) of high-pressure fuel supplied, to the cylinder injection injector 21 is disposed in the high-pressure fuel delivery pipe 20. A low-pressure fuel pressure sensor 312 (see FIG. 2) for detecting a pressure (fuel pressure) of low-pressure fuel supplied to the intake port injection injector 22 is disposed in the low-pressure fuel delivery pipe 23.

Both the cylinder injection injector 21 and the intake port injection injector 22 are electromagnetically-driven actuators. When a predetermined voltage is applied, this electromagnetically-driven actuator is opened to inject fuel. The high-pressure pump 25 and the low-pressure pump 24 are actuators for supplying fuel to the injectors 21, 22.

The operation (injection period, i.e., injection amount and injection timing) of the injectors 21, 22 and the discharge quantity and discharge pressure of the fuel pumps 24, 25 are controlled by the ECU 500 described below.

Then, fuel is injected from any one or both of the cylinder injection injector 21 and the intake port injection injector 22 so that fuel-air mixture of air and fuel gas is formed within the combustion chamber. The formed fuel-air mixture is ignited by the ignition plug 6 so that it burns and explodes. The piston 3 is pressed down by high-temperature, high-pressure combustion gas produced at this time to rotate the crankshaft 5. With opening of the exhaust air valve 14, the combustion gas is discharged into the exhaust air passage 12.

Figure 2:
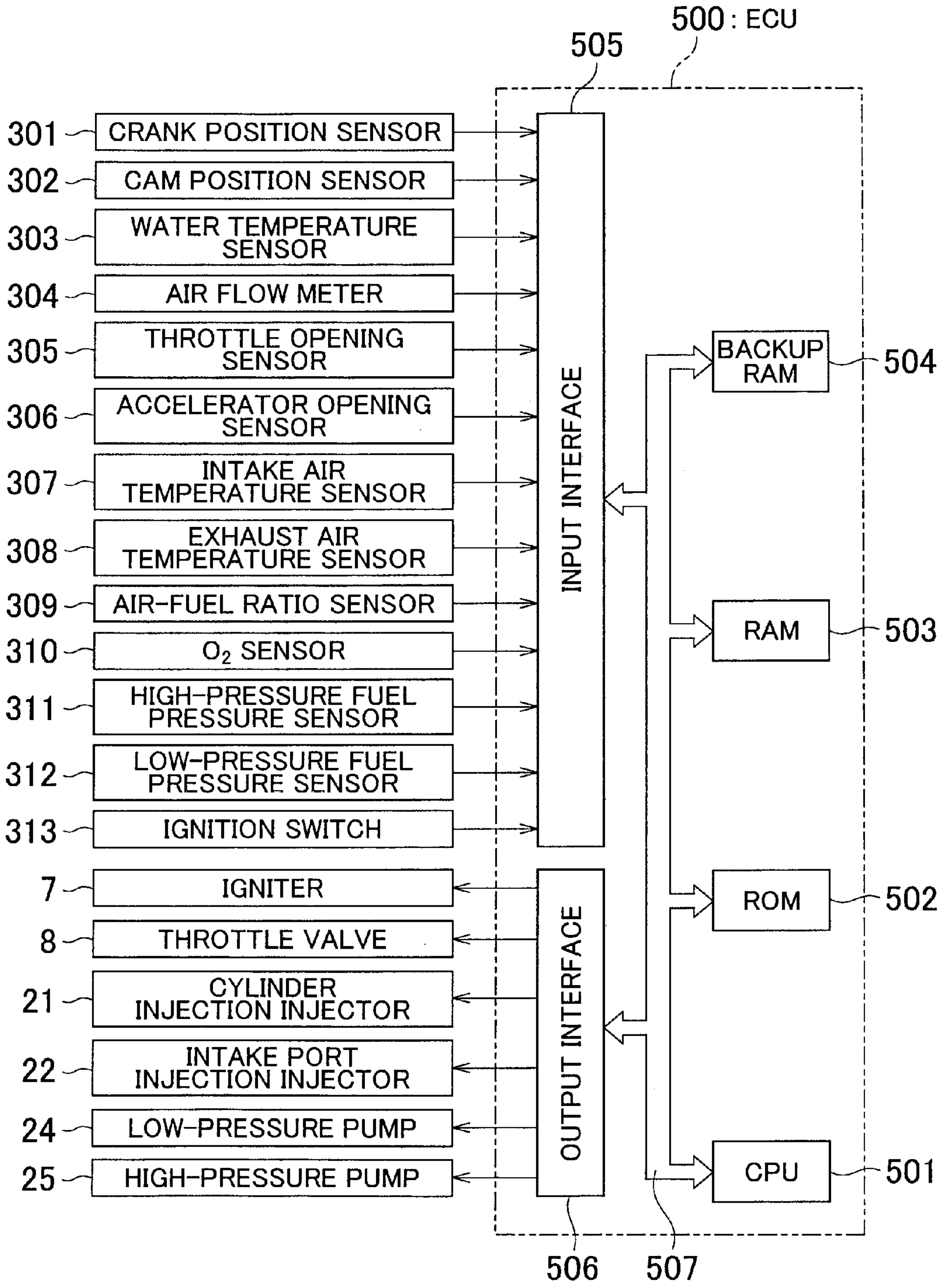
FIG. 2 is a configuration diagram showing an example of an electronic control unit (ECU) according to the embodiment.

As shown schematically in FIG. 2, the ECU 500 includes, a central processing unit (CPU) 501, a read-only memory (ROM) 502, a random access memory (RAM) 503 and a backup RAM 504.

Various kinds of control programs and maps to be referred in executing those various kinds of control programs are stored in the ROM 502. The CPU 501 executes various kinds of arithmetic processing based on the various kinds of control programs and maps stored in the ROM 502. The RAM 503 is a memory which stores an arithmetic result in the CPU 501 and data input from each sensor temporarily. The backup RAM 504 is a nonvolatile memory which stores data which should be stored when the engine 1 is stopped, for example.

The CPU 501, the ROM 502, the RAM 503 and the backup RAM 504 are connected to each other via a bus 507 and are connected to an input interface 505 and an output interface 506.

Various sensors are connected to the input interface 505. The various sensors include a crank position sensor 301, a cam position sensor 302, a water temperature sensor 303, an air flow meter 304, a throttle opening sensor 305, an accelerator opening sensor 306, an intake air temperature sensor 307, an exhaust air temperature sensor 308, an air-fuel, ratio sensor 309, an $O_2$ sensor 310, a high-pressure fuel pressure sensor 311 and a low-pressure fuel pressure sensor 312.

An ignition switch 313 is connected to the input interface 505. When this ignition switch 313 is turned ON, cranking of the engine 1 by a starter motor (not shown) is started. On the other hand, the igniter 7 of the ignition plug 6, the throttle motor 8*a* of the throttle valve 8, the cylinder, injection injector 21, the intake port injection injector 22, the low-pressure pump 24, and the high-pressure pump 25 are connected to the output interface 506.

Then, the ECU 500 executes various controls of the engine 1 based on signals from the aforementioned various sensors 301 to 312 and the switch 313. The various controls of the engine 1 include energization control of the ignition plug 6 by the igniter 7, control of the throttle valve 8 (throttle motor 8*a*), and fuel injection control by operation control of the injectors 21, 22 and the pumps 24, 25.

As a result, the operating state of the engine 1 is preferably controlled so that demands about fundamental functions including drivability, exhaust gas and fuel consumption are satisfied at an excellent balance. That is, the ECU 500 achieves demands about various functions of the engine 1 by coordinative control of plural actuators (igniter 7, throttle valve 8, injectors 21, 22, pumps 24, 25). An electronic control unit for the internal combustion engine according to an embodiment of the present invention is achieved by the control program which is to be executed by the ECU 500.

Figure 3:
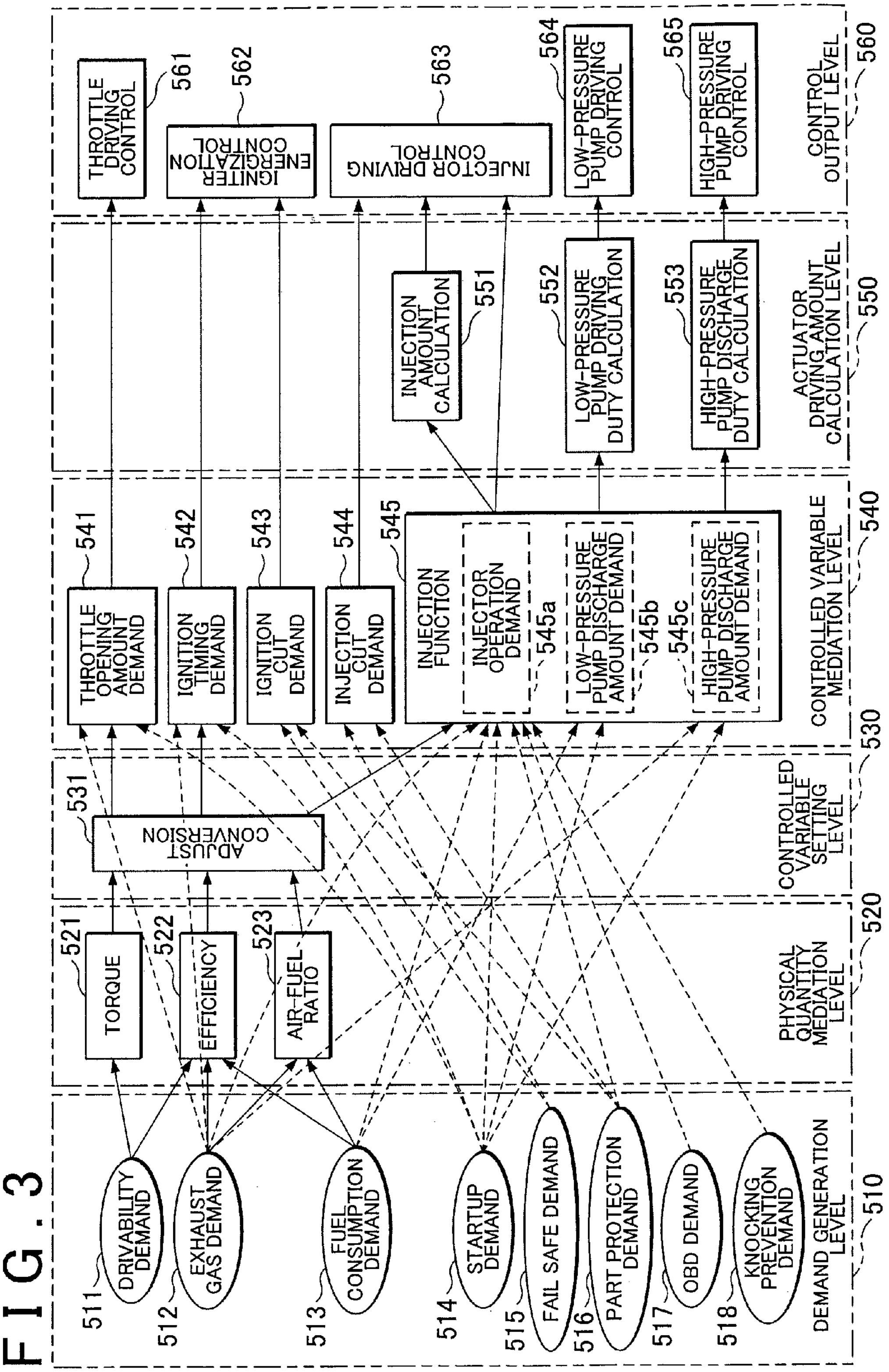
FIG. 3 is a block diagram showing a hierarchical structure of an electronic control unit according to the embodiment.

Next, the configuration and the features of the electronic control unit of the present embodiment will be described in detail. FIG. 3 shows respective elements of the electronic control unit with blocks and transmission of a signal between the blocks is indicated with an arrow. In this example, the electronic control unit has a hierarchical control structure composed of six levels 510 to 560. The demand generation level 510 is provided on the highest level of the six ones. A physical quantity mediation level 520 and a controlled variable setting level 530 are provided below the demand generation level 510. A controlled variable mediation level 540 and an actuator driving amount calculation level 550 are provided below the controlled variable setting level 530. A control output level 560 is provided on the lowest level of the six ones.

Signal flow is in a single direction between the aforementioned six levels 510 to 560. A signal is transmitted from the demand generation level 510 to the physical quantity mediation level 520, from the physical quantity mediation level 520 to the controlled variable setting level 530, and from the controlled variable setting level 530 to the controlled variable mediation level 540. In addition, a common signal distribution system is provided independently of the six levels 510 to 560 in which the signal flow is in a single direction. Common signals are distributed in parallel to each of the levels 510 to 550 by the common signal distribution system. Representation of the common signal distribution system is omitted here.

There is a following difference between a signal transmitted between the six levels 510 to 560 and a signal distributed through the common signal distribution system. The signal transmitted between the six levels 510 to 560 is a signal of a demand about the function of the engine 1 which is finally converted to a controlled variable for the actuators 7, 8, . . . . To the contrary, the signal distributed by the common signal distribution system is a signal which contains information necessary for generating a demand or calculating a controlled variable.

More specifically, the signals distributed through the common signal distribution system include information concerning the operating condition and the operating state of the engine 1 (engine speed, intake air amount, estimation torque, real ignition timing at this time, cooling water temperature, operating mode). The information source thereof is from various sensors 301 to 312 provided in the engine 1 and estimation function inside the electronic control unit. If information concerning the operating condition and the operating state of the engine 1 is distributed in parallel to the respective levels 510 to 550, not only communication amount between the levels 510 to 550 can be reduced, but also simultaneity of information between the levels 510 to 550 can be held. The reason is that information concerning the operating condition and the operating state of the engine 1 is common engine information used commonly by the respective levels 510 to 550.

Hereinafter, the configuration of the respective levels 510 to 560 and processing executed there will be described in order from the highest level. A plurality of demand output portions 511 to 518 are disposed on the demand generation level 510. The demand output portions 511 to 518 are provided for each function of the engine 1. The demand mentioned here refers to a demand concerning the function of the engine 1 (or a performance required in the engine 1). Because the function of the engine 1 diversifies, a content of the demand output portion disposed on the demand generation level 510 differs depending on what is demanded to the engine 1 or to which precedence is given.

In the present embodiment, the control must be performed on the premise of satisfying drivability, exhaust gas and fuel consumption at an excellent balance in order to drive the engine 1 of a vehicle efficiently corresponding to a driver's driving operation and meet a demand for natural environment protection. Drivability, exhaust gas and fuel consumption are fundamental functions of the engine 1. Thus, the demand output portion 511 corresponding to the function concerning drivability, the demand output portion 512 corresponding to the function concerning exhaust gas, and the demand output portion 513 corresponding to the function of fuel consumption are provided on the demand generation level 510.

In the present embodiment, other demands than the above-described three fundamental functions are considered. For example, startup demand, fail safe demand, part protection demand, OBD demand, and knocking prevention demand are other demands than the demands concerning the three fundamental functions. Thus, as shown in FIG. 3, the demand output portions 514 to 518 corresponding to each of those demands are also provided on the demand generation level 510. A detailed description of the demand output portions 514 to 518 will, be described below.

The demand output portions 511 to 513 digitize and outputs drivability, exhaust gas and fuel consumption which are demands concerning the fundamental functions of the engine 1. By digitizing a demand concerning the function of the engine 1, the demand concerning the function of the engine 1 can be reflected on the controlled variables of the actuators 7, 8, . . . . The arithmetic operation for determining the controlled variables of the actuators 7, 8, . . . will be described below. In the present embodiment, the demand concerning the fundamental function of the engine 1 is expressed with a physical quantity concerning an operation of the engine 1.

As the physical quantity concerning the operation of the engine 1, only three physical quantities, i.e., torque, efficiency and air-fuel ratio are used. The output of the engine 1 is mainly torque, heat and exhaust gas (heat and ingredient). The output of the engine 1 is related to the aforementioned fundamental functions of the engine 1 such as drivability, exhaust gas, and fuel consumption. Thus, the three physical quantities, torque, efficiency and air-fuel ratio must be determined to control the output of the engine 1. That is, a demand concerning the fundamental function of the engine 1 can be reflected on the output of the engine 1 by expressing the demand concerning the fundamental functions of the engine 1 with three physical quantities and controlling the operations of the actuators 7, 8, . . . .

In FIG. 3, as an example, the demand output portion 511 outputs a demand concerning drivability (drivability demand). The demand concerning drivability is output as a demand value expressed with torque or efficiency (indicated with an arrow of solid line in FIG. 3). For example, if the demand is about acceleration of a vehicle, that demand can be expressed with torque. If the demand is about prevention of engine stall, that demand can be expressed with efficiency (raising efficiency).

The demand output portion 512 outputs a demand concerning exhaust gas. The demand concerning exhaust gas is output as a demand value expressed with efficiency or air-fuel ratio (indicated with an arrow of solid line in FIG. 3). For example, if the demand is about warm-up of the catalyst 17, that demand can be expressed with efficiency (decreasing efficiency) and it may be expressed with air-fuel ratio also. Decreasing efficiency raises exhaust gas temperature and air-fuel ratio can form an environment in which the catalyst 17 reacts easily.

In addition, the demand output portion 513 outputs a demand concerning fuel consumption. The demand concerning fuel consumption is output as a demand value expressed with efficiency or air-fuel ratio (indicated with an arrow of solid line in FIG. 3). For example, if the demand is increasing combustion efficiency, that demand may be expressed with efficiency (increasing efficiency). If the demand is decreasing pumping loss, that demand may be expressed with air-fuel ratio (lean burn).

In the meantime, the demand values output from the demand output portions 511 to 513 as described above are not limited to one demand about each physical quantity. As an example, the demand output portion 511 outputs not only a torque which a driver demands (torque calculated from an opening amount of accelerator) but also a torque which various devices related to vehicle control demand at the same time. The various devices related to vehicle control are vehicle stability control system (VSC), traction control system (TRC), antilock brake system (ABS), and transmission. The same thing can be said of efficiency.

Furthermore, as indicated with an arrow of dotted line in FIG. 3, the demand output portions 512, 513 of the present embodiment output a specific demand concerning operations of the actuators 7, 8, . . . . The specific demands concerning the operations of the actuators 7, 8, . . . are output as a demand value expressed with a controlled variable of the actuators 7, 8, . . . . This will be described later.

Common engine information is distributed from the common signal distribution system to the demand generation level 510. By referring to the distributed common engine information, the respective demand output portions 511 to 513 determine a demand value which should be output. The reason is that the content of the demand changes depending on the operating condition or operating state of the engine 1. For example if catalyst temperature is measured by the exhaust air temperature sensor 308, the demand output portion 512 determines a necessity of warm-up of the catalyst 17 based on temperature information obtained by the exhaust air temperature sensor 308. Then, corresponding to a result of the aforementioned determination, the demand output portion 512 outputs a demand value which is expressed with efficiency or air-fuel ratio.

As described above, the demand output portions 511 to 513 output a plurality of demands which are expressed with torque, efficiency or air-fuel ratio. However, it is impossible to achieve all the plural demands completely at the same time. The reason is that even if plural torques are demanded, only one torque can be achieved. Likewise, even if plural efficiencies are demanded, only one efficiency can be achieved and even if plural air-fuel ratios are demanded, only one air-fuel ratio can be achieved. Thus, processing for mediating such demands is necessary.

The physical quantity mediation level 520 mediates a demand value output from the demand generation level 510. The mediation portions 521 to 523 are provided on the physical quantity mediation level 520 for each physical quantity which corresponds to classification of the demand. The mediation portion 521 aggregates demand values expressed with torque and mediates to a torque demand value. The mediation portion 522 aggregates demand values expressed with efficiency and mediates to an efficiency demand value. Then, the mediation portion 523 aggregates demand values expressed with air-fuel ratio and mediates to an air-fuel ratio demand value.

These mediation portions 521 to 523 perform mediation according to a predetermined rule. The rule mentioned here refers to a calculation rule for obtaining a numerical value from plural numerical values, for example, selection of a maximum value, selection of a minimum value, an average or superposition and those plural calculation rules may be combined appropriately. However, which rule should be adopted depends on a design of the electronic control unit and the present invention does not restrict the content of the rule.

Additionally, the common engine information is distributed from the common signal distribution system to the physical quantity mediation level 520, so that the common engine information can be used by the respective mediation portions 521 to 523. For example, although the mediation rule may be changed depending on the operating condition or the operating state of the engine 1, as described below, the mediation rule is never changed considering a torque range which the engine 1 can achieve.

In the mediation portions 521 to 523, no upper limit torque or lower limit torque, which the engine 1 can achieve is considered in the mediation. Further, a result of mediation performed by one of the mediation portions 521 to 523 is not considered in the mediation of other mediation portions. That is, the respective mediation portions 521 to 523 perform mediation independently without considering the upper limit torque or lower limit torque of the torque range which the engine 1 can achieve or an mediation result by other mediation portions. This also contributes to reduction of arithmetic operation load for the control.

When the respective mediation portions 521 to 523 perform mediation as described above, a torque demand value, an efficiency respect value and an air-fuel ratio demand value are output from the physical quantity mediation level 520. Then, on the controlled variable setting level 530 which is a level just below the physical quantity mediation level 520, controlled variables for the actuators 7, 8, . . . are set based on the torque demand value, the efficiency demand value and the air-fuel ratio demand value mediated by the physical quantity mediation level 520.

According to the present invention, an adjustment converting portion 531 is provided on each one of the controlled variable setting level 530. The controlled variable setting level 530 adjusts a magnitude of a torque demand value, an efficiency demand value and an air-fuel ratio demand value mediated by the physical quantity mediation level 520. Because the torque range which the engine 1 can achieve is not considered on the physical quantity mediation level 520 as described above, the engine 1 can be driven properly depending on the magnitude of each demand value. Then, the adjustment converting portion 531 adjusts each demand value based on a relationship between the respective demand values in order to enable the engine 1 to be driven properly.

The torque demand value, the efficiency demand value and the air-fuel ratio demand value are calculated independently on higher levels than the controlled variable setting level 530, so that calculated values are never used mutually or referred to each other between factors related to the calculation. That is, the torque demand value, the efficiency demand value and the air-fuel ratio demand value are referred to each other for the first time on the controlled variable setting level 530. Because the adjustment targets are limited to three, i.e., the torque demand value, the efficiency demand value, and the air-fuel ratio demand value, the arithmetic operation load required for the adjustment may be small.

How the aforementioned adjustment should be performed depends on the design of the electronic control unit and the content of the adjustment is not limited, in the present invention. However, if there is an order of priority among the torque demand value, the efficiency demand value and the air-fuel ratio demand value, a demand value having a lower priority may be adjusted (corrected). For example, a demand value having a high priority is reflected on the controlled variables of the actuators 7, 8, . . . as it is as much as possible. A demand value having a low priority is reflected on the controlled variables of the actuators 7, 8, . . . after adjusted.

As a result, within a range in which the engine 1 is driven appropriately, a demand having a high priority can be achieved sufficiently while a demand having a low priority can be achieved to some extent. As an example, if the priority of the torque demand value is the highest, the efficiency demand value and the air-fuel ratio demand value are corrected. When the efficiency demand value and the air-fuel ratio demand value are corrected, of the efficiency demand value and the air-fuel ratio demand value, the degree of correction of a demand having a lower priority is made larger. If the order of the priority changes depending on the operating condition of the engine 1 or the like, the order of the priority is determined based on the common engine information distributed from the common signal distribution system and then, which demand value should be corrected is determined.

On the controlled variable setting level 530, a new signal is generated using a demand value input from the physical quantity mediation level 520 and the common engine information distributed from the common signal distribution system. For example, a ratio between the torque demand value mediated by the mediation portion 521 and an estimation torque contained in the common engine information is calculated by a division portion (not shown). The estimation torque is a torque which is output when the ignition timing is set to MBT with a current intake air amount and a current air-fuel ratio. The arithmetic operation for the estimation torque is performed in a different task of the electronic control unit.

If the priority of the torque demand value is the highest as described above although a detailed description is omitted, the torque demand value, a corrected efficiency demand value, a corrected air-fuel ratio demand value and a torque efficiency are calculated by the controlled variable setting level 530. Of the torque demand value, the corrected efficiency demand value, the corrected air-fuel ratio value and the torque efficiency, a throttle opening amount is calculated (converted) from the torque demand value and the corrected efficiency demand value, and the calculated throttle opening amount is transmitted to the controlled variable mediation level 540.

More specifically, first, the torque demand value is divided by the corrected efficiency demand value. Because the corrected efficiency demand value is 1 or less, dividing the torque demand value by the corrected efficiency demand value raises the torque demand value. The raised torque demand value is converted to an amount of air and a throttle opening amount is calculated from the amount of air. In the meantime, conversion from the torque demand value to the amount of air and calculation of the throttle opening amount from the amount of air are carried out by reference to a predetermined map.

Further, the ignition timing is calculated (converted) from mainly torque efficiency. When the ignition timing is calculated, the torque demand value and the corrected air-fuel ratio demand value are used as a reference signal. More specifically, by reference to the map, a retard amount of the ignition timing relative to MBT is calculated from the torque efficiency. The smaller the torque efficiency, the larger the retard amount of the ignition timing is. As a result, the torque drops. The aforementioned raising of the torque demand value is processing for compensating for a reduction in the torque due to the retard of the ignition timing.

According to the present invention, both the torque demand value and the efficiency demand value can be achieved by the retard of the ignition timing based on the torque efficiency and the raising of the torque demand value based on the efficiency demand value. In the meantime, the torque demand value and the corrected air-fuel ratio demand value are used to select a map for converting the torque efficiency to the retard amount of the ignition timing. Then, final ignition timing is calculated from the retard amount of the ignition timing and the MBT (or basic ignition timing).

Further, a fuel injection amount is calculated from the corrected air-fuel ratio demand value and an intake air amount into the cylinder 2 of the engine 1. The intake air amount is contained in the common engine information and distributed to the adjustment converting portion 531 from the common signal distribution system.

As a result of the above processing, the signals transmitted from the controlled variable setting level 530 (adjustment converting portion 531) to the controlled variable mediation level 540 are a demand value of the throttle opening amount, a demand value of the ignition timing and a demand value of the fuel injection amount. These signals are input to mediation portions 541, 542, 545 of the controlled variable mediation level 540 and then mediated as described in detail below.

As shown in FIG. 3, the controlled variable mediation level 540 includes the mediation portions 541 to 545 (545*a* to 545*c*) for each controlled variable of the actuators 7, 8, . . . based on the classification of the demands. In the example of FIG. 3, the mediation portion 541 aggregates the demand values of the throttle opening amount and mediates the aggregated throttle opening amount demand values to a single demand value. The mediation portion 542 aggregates the demand values of the ignition timing and mediates the aggregated ignition timing demand values to a single demand value. Further, the mediation portion 543 mediates the demand value which expresses an ignition stop (ignition cutoff) and the mediation portion 544 mediates the demand value which expresses a fuel injection stop (injection cutoff).

Further, the mediation portion 545 mediates a plurality of controlled variable demand values concerning fuel injection collectively. In the example of FIG. 3, the mediation portion 545 is an injection function mediation portion (integrated mediation portion) in which an mediation portion 545*a* (injector controlled variable mediation portion) for mediating the controlled variables of the injectors 21, 22, an mediation portion 545*b* for mediating a controlled variable of the low-pressure pump 24, and an mediation portion 545*c* for mediating the controlled variable of the high-pressure pump 25 are integrated.

The mediation portion 545 mediates the controlled variables of the plural actuators including the injectors 21, 22, the low-pressure pump 24, and the high-pressure pump 25 integrally by correlating to each other. Thus, the injection function mediation portion 545 is configured to achieve the functions of the three mediation portions 545*a*, 545*b*, 545*c*, for example, in the same processing step of the control program. As a result, the simultaneity of mediation of the controlled variables of the injectors 21, 22, the low-pressure pump 24 and the high-pressure pump 25 can be secured.

The respective mediation portions 541 to 545 (545*a* to 545*c*) perform mediation according to a predetermined rule like the respective mediation portions 521 to 523 on the physical quantity mediation level 520. The rule depends on the design of the electronic control unit and the present invention does not limit the content of the rule. In the case of mediation performed on the controlled variable mediation level 540, an order of priority is set preliminarily about the signal demands transmitted and the mediation is performed based on the order of priority. In the meantime, the common engine information is distributed to the controlled variable mediation level 540 also from the common signal distribution system, so that the respective mediation portions 541 to 545 can use the common engine information.

As described above, the respective mediation portions 541 to 545 perform mediation and as a result, the controlled variable mediation level 540 outputs a throttle opening amount demand value, an ignition timing demand value (or ignition cut demand value), a pair of injection amount demand values (or injection cut demand values) and a pair of injection timing demand values of the injectors 21, 22, a low-pressure pump discharge amount demand value and a high-pressure pump discharge pressure demand value.

Controlled variables of the actuators 7, 8, . . . are calculated as required based on each demand value on the actuator driving amount calculation level 550 which is a level below the controlled variable mediation level 540. In the example of FIG. 3, a calculating portion 551 calculates an injection amount (injection period) from an injection amount demand value transmitted from the injection function mediation portion 545 (545*a*) of the controlled variable mediation level 540. Further, the calculating portion 552 calculates a low-pressure pump driving duty from a low-pressure pump discharge amount demand value transmitted from the mediation portion 545*b*. The calculating portion 553 calculates a high-pressure pump discharge amount from a high-pressure pump fuel pressure demand value transmitted from the mediation portion 545*c*.

Then, control output portions 561 to 565 are provided on the lowest control output level 560 corresponding to a signal transmitted from the actuator driving amount calculation level 550. A throttle opening amount demand value is transmitted to the control output portion 561 (throttle driving control portion) and a throttle driving signal is output corresponding to the transmitted throttle opening amount demand value. An ignition timing demand value or an ignition cut demand value is transmitted to the control output portion 562 (igniter energization control portion) and an igniter energization signal is output corresponding to the transmitted ignition timing demand value or ignition cut demand value.

Demand values of an injection amount and an injection timing, or an injection cut demand value are transmitted to the control output portion 563 (injector driving control portion) and an injector driving signal is output corresponding to the transmitted demand values of the injection amount and injection timing or the injection cut demand value. A low-pressure pump driving duty is transmitted to the control output portion 564 (low-pressure pump driving control portion) and a low-pressure pump driving signal is output corresponding to the transmitted low-pressure pump driving duty. A demand value of a high-pressure pump discharge amount is transmitted to the control output portion 565 (high-pressure pump driving control portion) and a high-pressure pump driving signal is output corresponding to the transmitted high-pressure pump discharge amount demand value.

Next, the mediation of the controlled variable of the actuator on the controlled variable mediation level 540 will be described specifically with reference to FIG. 3 and FIGS. 4 to 6. As described above, the electronic control unit of the present embodiment expresses the demands on the fundamental functions of the engine 1, i.e., drivability, exhaust gas and fuel consumption, with a combination of the three physical quantities including torque, efficiency and air-fuel ratio and mediates such a function demand on the physical quantity mediation level 520. By expressing and mediating the fundamental function demands of the engine 1 with the three physical quantities, the engine 1 can be driven in a preferable condition which satisfies the fundamental function demands at an excellent balance.

However, the functions demanded to the engine 1 are not only the fundamental functions such as drivability, exhaust gas and fuel consumption, but also a demand with a high urgency such as fail safe, a demand only under a specific condition such as startup and OBD, and a demand on the controlled variable of the operation of the injectors 21, 22. The functions demanded to the engine 1 other than the fundamental functions are not suitable for a method of expressing those with the three physical quantities including torque, efficiency and air-fuel ratio and mediating.

For example, if the operating state is changed corresponding to a demand with a high urgency such as fail safe, part protection, that processing must be performed as quickly as possible. If after such a demand is converted to a demand value about torque, efficiency or air-fuel ratio temporarily and then mediated, the controlled variable of actuators such as the igniter 7 and the injectors 21, 22 is set, an excess arithmetic operation load occurs which is disadvantageous for increasing the processing speed.

That is, restriction of the intake air amount to suppress a rise in engine speed can be performed by simply limiting the throttle opening amount (controlled variable of the throttle valve 8). If after converted to a physical quantity such as torque temporarily, the throttle opening amount is mediated on the physical quantity mediation level 520 and the throttle opening amount is calculated again based on the mediated demand value, an excess calculation must be performed.

Further, for the engine 1, there are demands which occur under only specific situations such as startup, stop, OBD as well as those under normal operating condition. Because these demands can be expressed simply with a control sequence such as throttle opening amount, fuel injection amount, ignition timing, the meaning of expressing those with the physical quantity such as torque and mediating it is small and further, an excess arithmetic operation load occurs as described above.

Further, because the engine 1 of the present embodiment can inject fuel directly into the combustion chamber of the cylinder 2 from the cylinder injection injector 21, the freedom of injection control is high. There is a demand for changing the injection timing or injection frequency appropriately to form an excellent fuel-air mixture. Because the injection timing and the injection frequency mean just operations of the injectors 21, 22, that is, the controlled variables of the injectors 21, 22, the arithmetic operation load is smaller when the injection timing and the injection frequency are set directly as a controlled variable than when they are expressed with the physical quantity such as torque.

From such a viewpoint, according to the present embodiment, the demand output portions 514 to 518 are provided on the demand generation level 510 corresponding to startup demand, fail safe demand, part protection demand, OBD demand, knocking prevention demand, for example, as shown in FIG. 3. Then, these demand output portions 514 to 518 outputs demands as a demand value expressed with the controlled variables of the actuators 7, 8, . . . not with the physical quantities.

As indicated with arrows of dotted line in FIG. 3, signals of these demand values are transmitted directly to the controlled variable mediation level 540 not through the physical quantity mediation level 520 or the controlled variable setting level 530. With the demand values of the throttle opening amount, the ignition timing or the fuel injection amount transmitted from the controlled variable setting level 530 to the controlled variable mediation level 540 as described above, these demand values are aggregated about each controlled variable. The demand values aggregated about each controlled variable are mediated to a single demand value of each controlled variable by the respective mediation portions 541 to 545 on the controlled variable mediation level 540.

Figure 4:
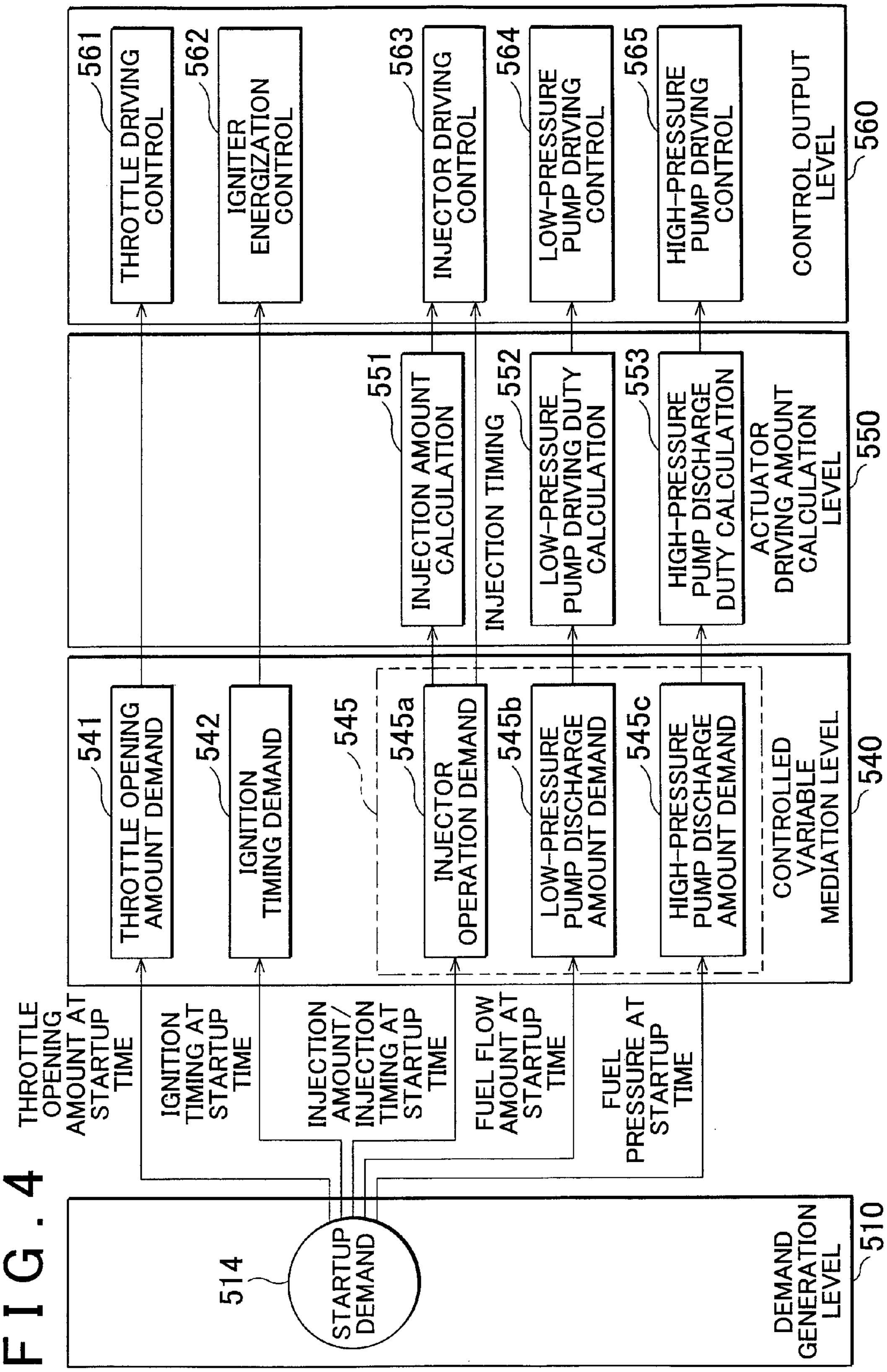
FIG. 4 is a block diagram showing an example of mediation of a startup demand in the embodiment.

As shown in FIG. 4, more specifically, a signal from the startup demand output portion 514 on the demand generation level 510 is transmitted to the throttle opening amount demand mediation portion 541, the ignition timing demand mediation portion 542 and the injection function mediation portions 545 (545*a*, 545*b*, 545*c*) on the controlled variable mediation level 540. Further, as shown in FIG. 5, a signal from the fail safe demand output portion 515 is transmitted to the ignition cut demand mediation portion 543 and the injection cut demand mediation portion 544.

Figure 5:
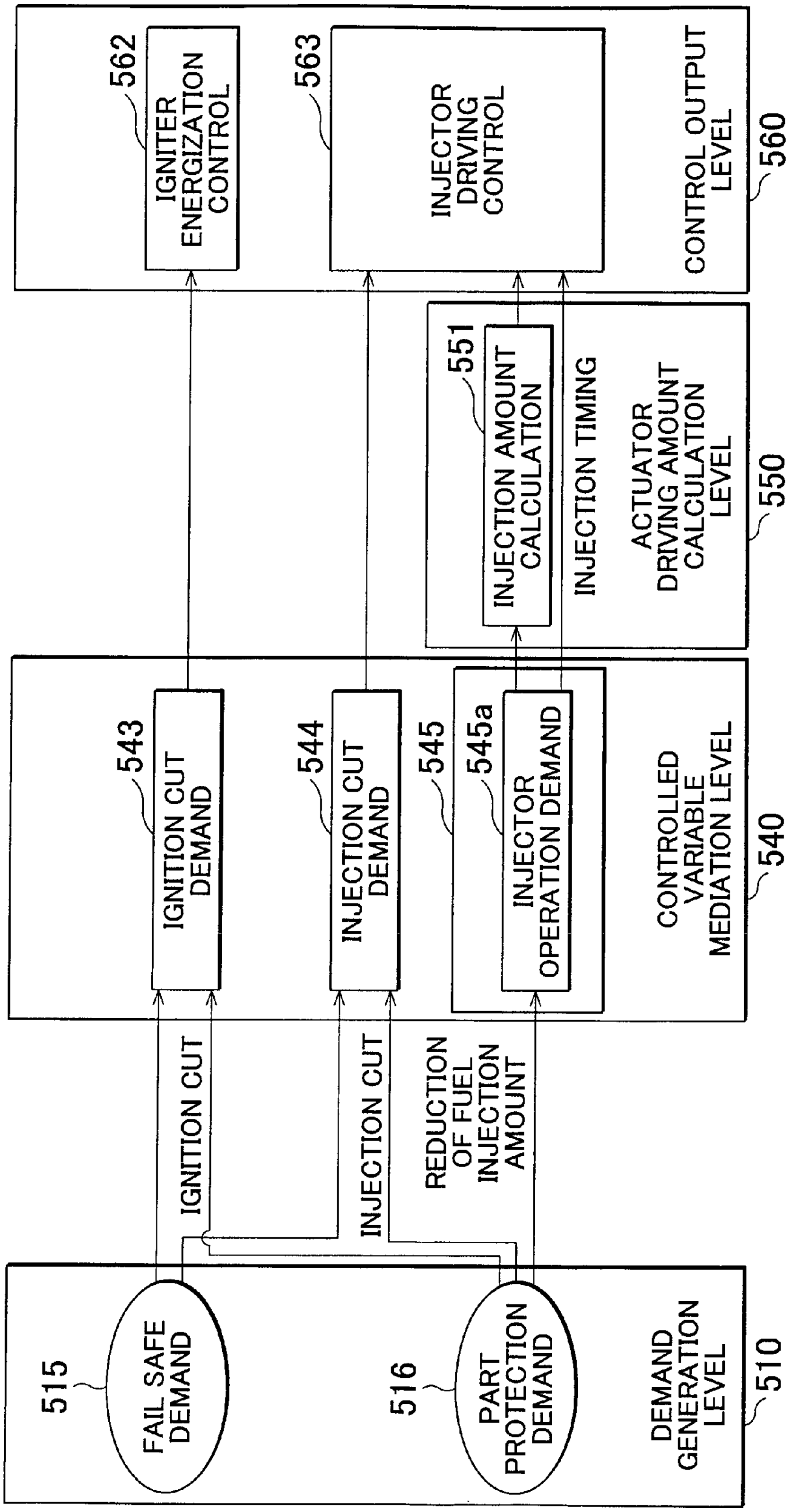
FIG. 5 is a diagram equivalent to FIG. 4 concerning mediation of a demand for fail safe and part protection.

Likewise, as shown in FIG. 5, a signal from the part protection demand output portion 516 is transmitted to the ignition cut demand mediation portion 543, the injection cut demand mediation portion 544, and the injection function mediation portion 545 (545*a*). As shown with arrows of dotted line in FIG. 3, a signal from the OBD demand output portion 517 and a signal from the knocking prevention demand output portion 518 are transmitted to the injection function mediation portion 545 (545*a*).

Figure 6:
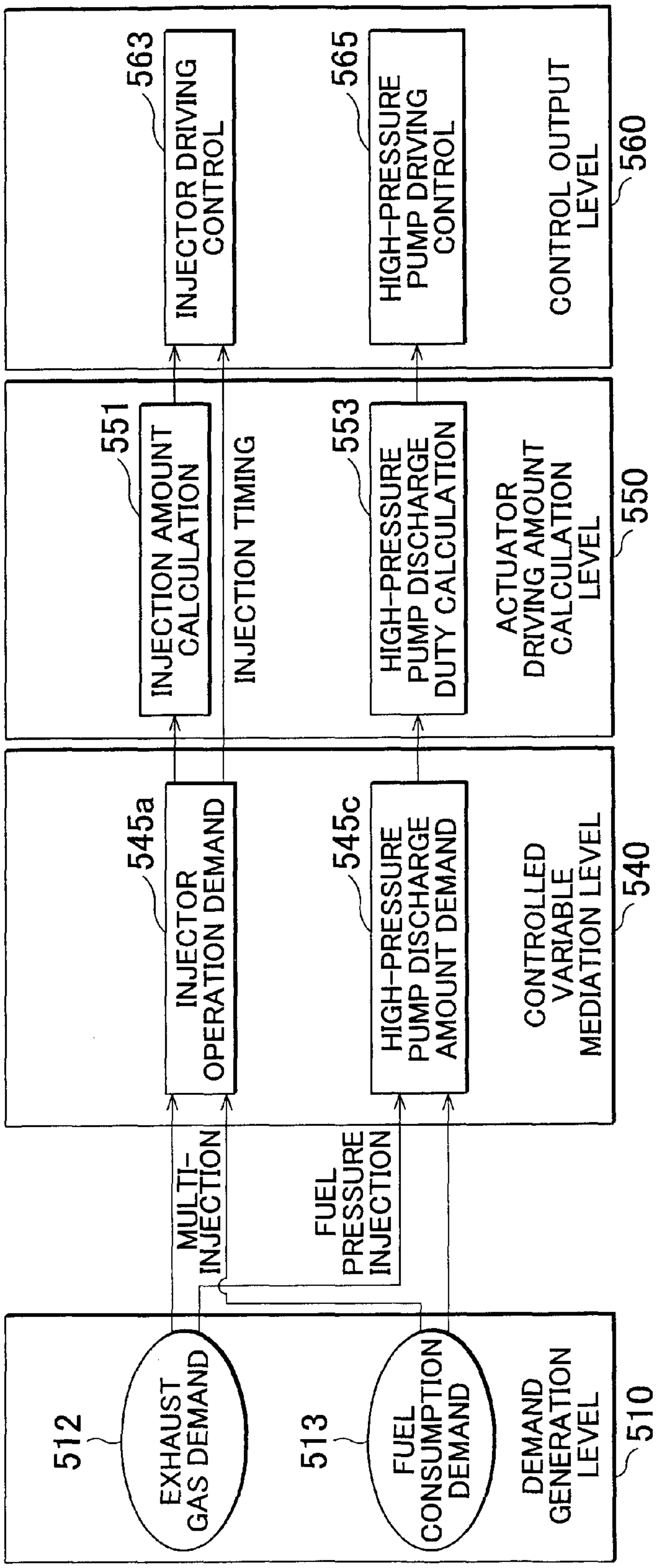
FIG. 6 is a diagram equivalent to FIG. 4 showing a demand for multi-injection as an example of injection function mediation.

Further, as shown with arrows of dotted line in FIG. 3 and as shown in FIG. 6, signals of specific demands (e.g., multi-injections described later) about operations of the injectors 21, 22 and the fuel pumps 24, 25 are transmitted from the exhaust gas demand output portion 512 and the fuel consumption demand output portion 513 on the demand generation level 510 directly to the controlled variable mediation level 540 not via the physical quantity mediation level 520. The specific demands are mediated by the injection function mediation portion 545 or the like described in detail later.

In the present embodiment, the order of priority is set preliminarily about signals output from the demand output portions 514 to 518. For example, if the engine 1 is stopped, the priority order of the startup demand is the highest and if the engine after startup is running, the priority order of the fail safe demand is the highest. After that, the priority order is set in order of part protection demand, OBD demand, and knocking prevention demand. Further, the priority order of any one of those demands is set higher than the fundamental demands during a driving of a vehicle (drivability, exhaust gas and fuel consumption).

As shown in FIG. 4, if a startup demand occurs on the startup demand output portion 514 on the demand generation level 510 corresponding to an operation of the ignition switch 313, a demand value expressed with the controlled variable of the actuator is generated. The demand values expressed with the controlled variable of the actuator include demand values for startup throttle opening amount for startup of the engine, startup ignition timing, startup injection amount and injection timing (operations of the injectors 21, 22), startup fuel amount (discharge amount of the low-pressure pump 24), and startup fuel pressure (discharge pressure of the high-pressure pump 25). These demand values are transmitted to the mediation portions 541, 542, 545 (545*a*, 545*b*, 545*c*) on the controlled variable mediation level 540.

These demand values activate the actuators such as the igniter 7, the throttle valve 8, the injectors 21, 22, the low-pressure pump 24, and the high-pressure pump 25 according to a predetermined startup control sequence. In the respective mediation portions 541, 542, 545 (545*a*, 545*b*, 545*c*) which have received signals of these demand values, each demand value for startup control is selected and output. For example, the control output portion 561 to which the demand value of the throttle opening amount is transmitted from the mediation portion 541 outputs a throttle driving signal and the control output portion 562 to which the demand value of an ignition timing is transmitted from the mediation portion 542 outputs an igniter energization signal.

An injection amount (injection period) signal is output from the calculating portion 551 by receiving the demand value of the injection amount from the injection function mediation portion 545, and the control output portion 563 to which this signal is transmitted outputs an injector driving signal. Further, the driving duty signal of a low-pressure pump 24 is output from the calculating portion 552 which has received the demand value of a discharge amount of the low-pressure pump 24, and the control output portion 564 to which this signal is transmitted outputs a low-pressure pump driving signal. A fuel pressure demand value signal is output from the calculating portion 553 which has received the demand value of a discharge pressure of the high-pressure pump 25, and the control output portion 565 to which this signal is transmitted outputs a high-pressure pump driving signal. As a result, preferable engine startup control is achieved.

As an example, according to the present embodiment, in an initial predetermined combustion cycle at startup time except at extremely low temperatures having a fear that an accidental fire may occur, fuel is injected by the cylinder injection injector 21 in a compression stroke of the cylinder 2 in order to increase startup responsiveness of the engine 1, so that the combustion state of the engine 1 turns into the stratified combustion state (at this time, fuel may be injected from the intake port injection injector 22 also.). To turn the combustion state of the engine 1 into the stratified combustion state, not only fuel is supplied to the injectors 21, 22 by the operation of the low-pressure pump 24, but also the discharge pressure of fuel from the high-pressure pump 25 is raised over a predetermined pressure.

At that time, if bubbles exist in a pipe which supplies fuel to the injectors 21, 22, no fuel is fed by a first one or two revolutions of the high-pressure pump 25, but the startup responsiveness may drop. Thus, the low-pressure pump 24 is activated preliminarily. For example, if the power of a vehicle is turned ON, a discharge amount demand signal of the low-pressure pump 24 is output and when the ignition is turned ON after that, demands about the throttle opening amount, the ignition timing, the injector operation and the discharge pressure of the high-pressure pump 25 are output.

As a result, before the startup control of the engine 1 begins, the operation of the low-pressure pump 24 starts, so that the pressure of fuel in the pipe increases thereby eliminating the bubbles. Thus, at the same time when the rotation of the high-pressure pump 25 starts, fuel is supplied to the cylinder injection injector 21 from the high-pressure fuel delivery pipe 20 and injection of fuel is performed thereby improving the startup responsiveness.

For example, if any fault is detected during the operation of the engine 1 or an excessive temperature rise of a part is detected, fail safe demand or part protection demand occurs in the demand output portions 515, 516 on the demand generation level 510. As shown in FIG. 5, a demand value expressed with actuator controlled variable for stopping the operation of the engine 1 temporarily, that is, a demand value of ignition cut and injection cut is transmitted to the mediation portions 543, 544 on the controlled variable mediation level 540.

Because these demand values have a high priority, an ignition cut demand value and an injection cut demand value are output from the respective mediation portions 543, 544. The control output portion 562 (igniter energization control portion) on the control output level 560 to which this signal is transmitted stops output of the igniter energization signal and the control output portion 563 (injector driving control portion) stops output of an injector driving signal. As a result, ignition by the ignition plug 6 and injection of fuel by the injectors 21, 22 stop, so that the operation of the engine 1 is stopped soon.

In the meantime, in the case of part protection demand, the operation of the engine 1 is not required to be stopped depending on a case. In this case, a demand value for decreasing the injection amount of fuel is transmitted from the demand output portion 516 to the mediation portion 545*a* about the Controlled variables of the injectors 21, 22 in the injection function mediation portion 545. By receiving this demand, the injection amount calculating portion 551 calculates an injection amount based on the injection amount demand value transmitted from the mediation portion 545*a*, and corresponding to this, the control output portion 563 outputs an injector driving signal which decreases fuel.

In the present embodiment, the controlled variable mediation level 540 includes the ignition cut mediation portion 543 separately from the mediation portion 542 for mediating an ignition timing and further includes the injection cut mediation portion 544 separately from the injection function mediation portion 545 (545*a*) for mediating the controlled variables of the injectors 21, 22. This aims at allowing processing to be executed under a situation with a high urgency to stop the operation of the engine 1 corresponding to a demand for fail safe or part protection.

That is, if the ignition timing mediation portion 541 or the injection function mediation portion 545 is configured to mediate the demands about the ignition cut or the injection cut, the speed of all processing necessary for ignition and fuel injection must be accelerated thereby increasing the arithmetic operation load. Thus, the mediation portions 543, 544 about the ignition cut and the injection cut are provided independently to accelerate the speeds of those processing. In the meantime, if the processing of the injection cut mediation portion 544 is accelerated, processing for restarting the fuel injection after temporary stop is also accelerated which is advantageous for prevention of engine stall.

As shown with an arrow of dotted line in FIG. 3, for example, if an OBD demand for fault diagnosis is generated in the demand output portion 517 on the demand generation level 510, a controlled variable demand value for making the igniter 7, the throttle valve 8, the injectors 21, 22 perform a predetermined fault diagnostic operation is transmitted to the injection function mediation portion 545. By receiving this demand value, a fault diagnosis demand value is selected in the injection function mediation portion 545 and a signal is output to the actuator driving amount calculation level 550. As a result, the engine 1 turns into a predetermined operating state, thereby performing the fault diagnosis.

Further, for example, if knocking is detected during an operation of the engine 1 so that a knocking prevention demand is generated in the demand output portion 518 on the demand generation level 510, a demand value for increasing the fuel injection amount is transmitted to the injection function mediation portion 545 on the controlled variable mediation level 540. To decrease the combustion temperature, it is necessary to increase the fuel injection amount. By receiving this signal, the injection function mediation portion 545 selects increase of fuel for prevention of knocking and outputs a signal to the actuator driving amount calculation level 550. As a result, prevention of knocking is achieved. In the meantime, the ignition period may be retarded.

Further, as shown in FIG. 6, if the predetermined condition is established during the operation of the engine 1, a demand value for achieving multi-injection is output from the demand output portions 512, 513 about exhaust gas or fuel consumption. A demand value of the operation of the injectors 21, 22 (injection amount and injection timing) and a demand value of discharge pressure of the high-pressure pump 25 for increasing fuel pressure are output from the demand output portions 512, 513 about exhaust gas and fuel consumption. The multi-injection refers to fuel injection of executing fuel injection in a single combustion cycle dividedly by plural times with both the injectors of the cylinder injection injector 21 and the intake port injection injector 22 activated.

As an example, when removing deposit accumulated on an injection hole of the cylinder injection injector 21 or suppressing dilution of oil by fuel, the demand value about multi-injection is output from the exhaust gas demand output portion 512. Further, if it is intended to reduce fuel consumption by increasing dispersibility of fuel injection in a driving state in which noise from the cylinder injection injector 21 is difficult for a vehicle driver to hear, a demand value for multi-injection is output from the fuel consumption demand output portion 513.

If there is no demand for the aforementioned fail safe, part protection, OBD or knocking prevention during the operation of the engine 1, these demand values are transmitted. The injection function mediation portion 545 (mediation portions 545*a*, 545*c*) selects (mediates) demand values for multi-injection, that is, a controlled variable for activating the cylinder injection injector 21 and the intake port injection injector 22 and a controlled variable for raising the fuel discharge pressure of the high-pressure pump 25 at the same time.

Then, by receiving the injection amount demand value transmitted from the mediation portion 545*a*, the calculating portion 551 on the actuator driving amount calculation level 550 calculates an injection amount (injection period). The calculated injection amount signal is transmitted to the control output portion 563 on the control output level 560 and at the same time, the injection timing signal is transmitted from the mediation portion 545*a* directly to the control output portion 563. By receiving this signal, the control output portion 563 outputs an injector driving signal to execute injection operation plural times in a single combustion cycle of the engine 1.

By receiving a demand value about the discharge amount of the high-pressure pump 25 transmitted from the mediation portion 545*c*, the calculating portion 553 outputs a signal of a demand value for adjusting the discharge amount from the high-pressure pump 25 to meet this demand. The control output portion 565 to which, this signal is transmitted outputs a high-pressure pump driving signal for raising the discharge amount. As a result, the discharge amount and discharge pressure from the high-pressure pump 25 increase, so that a higher pressure fuel than a predetermined level is supplied from the high-pressure fuel delivery pipe 20 to the cylinder injection injector 21. Consequently, injection of fuel into the high-pressure cylinder 2 is achieved in the compression stroke.

Figure 7:
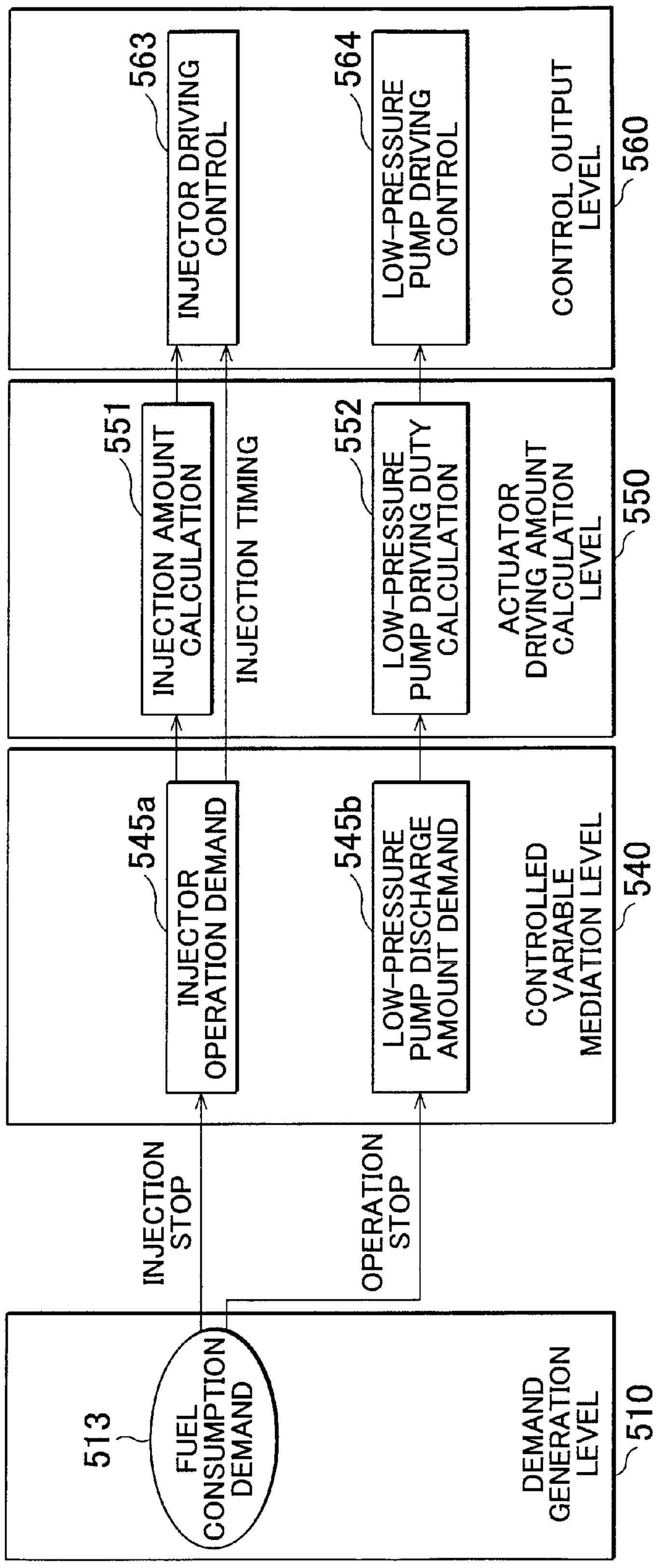
FIG. 7 is a diagram equivalent to FIG. 4 showing a demand for stop of low pressure pump operation when stopping injection.

As shown in FIG. 7, operations of the injectors 21, 22 and an operation of the low-pressure pump 24 are stopped at the same time by the demand output from the fuel consumption demand output portion 513 under a predetermined state. That is, for example, when stopping an operation of the engine 1 automatically with a stop of a vehicle (idle stop), a demand value for reducing fuel injection amount by the injectors 21, 22 to zero (injection stop) and a demand value for reducing the discharge amount of the low-pressure pump 24 to zero (operation stop) are output from the fuel consumption demand output portion 513.

By receiving these signals, a demand value for reducing the injection amount to zero is output from the mediation portion 545*a* in the injection function mediation portion 545. An injection operation signal for reducing the injection amount to zero is transmitted from the calculating portion 551 on the actuator driving amount calculation level 550, and the control output portion 563 outputs an injector driving signal for stopping the operation of the injectors 21, 22. Further, a demand value for reducing the discharge amount of the low-pressure pump 24 to zero is output from the mediation portion 545*b* and a control duty signal for reducing the discharge amount to zero is output from the calculating portion 552. The control output portion 564 outputs a low-pressure driving signal, for stopping the operation of the low-pressure pump 24.

In this way, when the operation of the engine 1 is stopped, the fuel injection by the injectors 21, 22 is stopped and the operation of the low-pressure pump 24 is also stopped. As a result, power consumption due to waste operation of the low-pressure pump 24 can be reduced, which is advantageous for reduction of fuel consumption of the engine 1.

Figure 8:
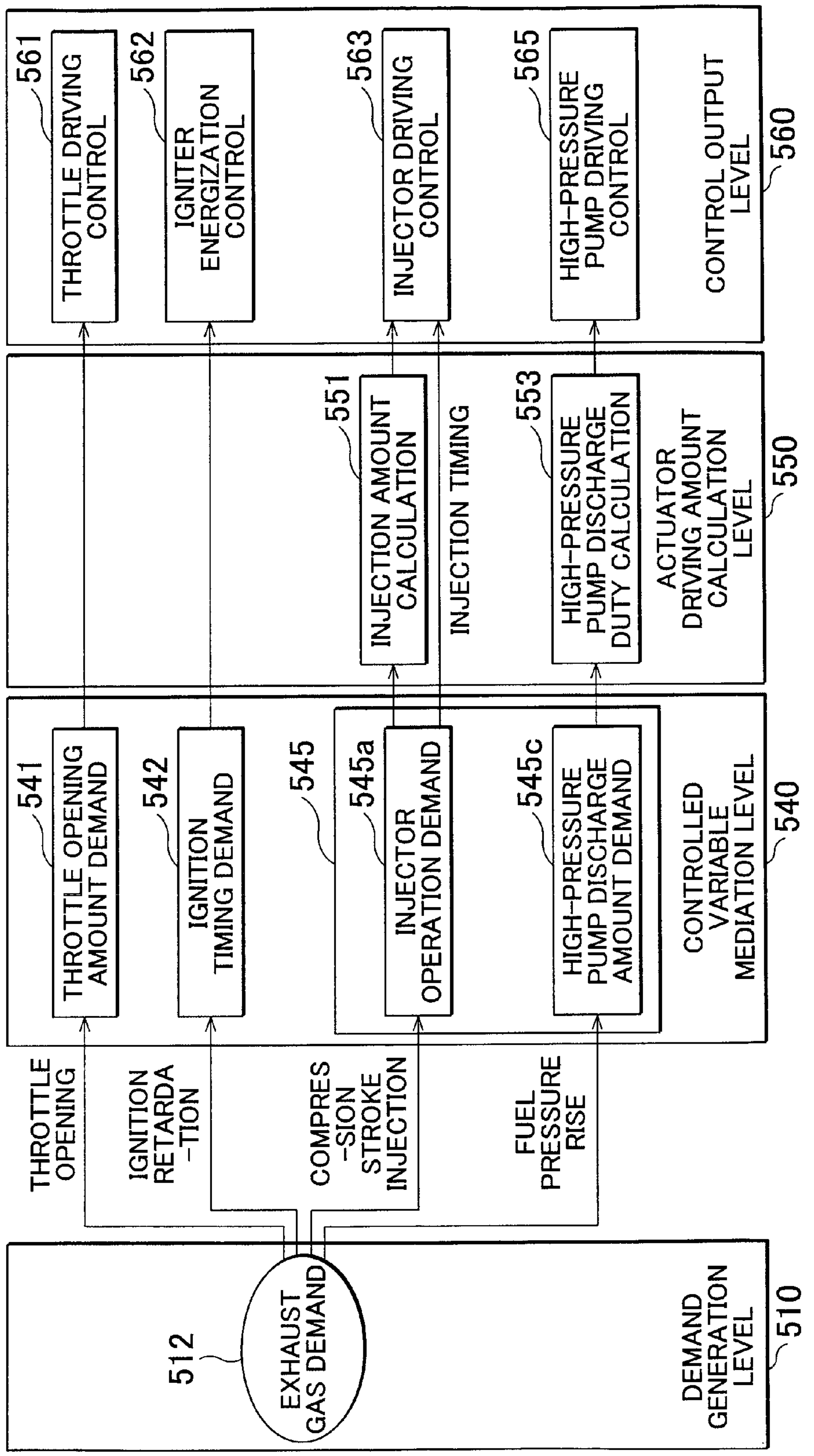
FIG. 8 is a diagram equivalent to FIG. 4 showing a demand for quick warm-up of catalyst.

Further, as shown in FIG. 8, demand values about a throttle opening amount for quick warm-up of catalyst, ignition timing, injection amount and injection timing of fuel and discharge pressure of the high-pressure pump 25 are transmitted from the exhaust gas demand output portion 512 directly to the controlled variable mediation level 540 not through the physical quantity mediation level 520. Usually, to raise the temperature of the catalyst 17 for its activation, an efficiency demand value transmitted from the demand output portion 512 to the mediation portions 522, 523 on the physical quantity mediation level 520 is changed and as a result, exhaust gas temperature rises due to the reduction of efficiency.

To the contrary, if it is intended to raise the exhaust air temperature to a maximum extent in order to warm up the catalyst 17 in the shortest time like just after cold start of the engine 1, the ignition timing must be retarded up to after the top dead center (TDC) so that the efficiency is reduced compared to the aforementioned warm-up of the catalyst. Retarding the ignition timing largely in this way worsens the combustibility. Thus, to prevent accident fire, the amount of air is increased and the fuel injection to be performed in the compression stroke is further retarded in order to increase the concentration of fuel-air mixture around the ignition plug 6.

For the reason, if a demand for quick warm-up of the catalyst occurs in the demand output portion 512, signals about a demand value for increasing the throttle opening amount (opening the throttle), a demand value for the ignition retardation, a demand value for the compression stroke injection, and a demand value for increasing fuel pressure are transmitted to the mediation portions 541, 542, 545 on the controlled variable mediation level 540. By receiving these signals, demand values about the throttle opening amount, the ignition timing, the operations of the injectors 21, 22 (injection amount and injection timing) and the discharge amount of the high-pressure pump 25 are output from the respective arbitrary portions.

The control output portion 561 to which the throttle opening amount demand value is transmitted from the mediation portion 541 outputs a throttle driving signal for increasing the throttle opening amount. The control output portion 562 to which the ignition timing demand value is transmitted from the mediation portion 542 outputs an igniter energization signal to retard the ignition timing. The calculating portion 551 which receives the injection amount demand value from the injection function mediation portion 545 outputs an injection amount signal and the control output portion 563 to which this signal is transmitted outputs an injector driving signal to make the cylinder injection injector 21 perform injection operation in the compression stroke of the cylinder 2.

Further, the calculating portion 553 which receives a discharge pressure demand value of the high-pressure pump 25 from the injection function mediation portion 545 outputs a discharge amount demand value necessary for obtaining the discharge pressure. By receiving this signal, the control output portion 565 outputs a high-pressure pump driving signal for increasing the discharge amount. By receiving this signal, the igniter 7, the throttle valve 8, the injectors 21, 22 and the fuel pumps 24, 25 operate so that the exhaust air temperature becomes as high as possible and the temperature of the catalyst 17 rises quickly. Instability of combustion due to large retardation of the ignition timing is suppressed by increasing the amount of the intake air and richness of fuel-air mixture around the ignition plug 6.

As described above, in the electronic control unit of the present embodiment, a signal is transmitted in a single direction from the demand generation level 510 which is the highest level of the hierarchical structure, through the lower-level physical quantity mediation level 520, controlled variable setting level 530, and controlled variable mediation level 540 to the actuator driving amount calculation level 550, thereby reducing the control arithmetic operation load.

Further, the fundamental function demands of the engine 1 such as drivability, exhaust gas and fuel consumption are expressed with a combination of three kinds of physical quantities including torque, efficiency and air-fuel ratio and mediated on the physical quantity mediation level 520. As a result, the engine 1 can be driven in a preferable state in which those fundamental demands are satisfied at an excellent balance.

On the other hand, demands for fail safe, startup or multi-injection are transmitted directly to the controlled variable mediation level 540 not via the physical quantity mediation and mediated. In other words, various kinds of demands concerning the functions of the engine 1 are sorted to a suitable one of the physical quantity mediation and the controlled variable mediation and processed. As a result, all the function demands can be preferably achieved without increasing control arithmetic operation load excessively.

Because the transmission of the signal from the demand generation level 510 to the physical quantity mediation level 520, the controlled variable setting level 530, and the controlled variable mediation level 540 is in a single direction, if a function for transmitting a demand directly to the controlled variable mediation level 540 is added, it is not necessary to change processing of the physical quantity mediation level 520 or the controlled variable setting level 530. Thus, there is such an advantageous effect that portions which should be changed in the control program are a few thereby contributing to reduction of man-hours.

Further, according to the present embodiment, the injection function mediation portion 545 is provided on the controlled variable mediation level 540 by combining the mediation portion 545*a* for mediating the controlled variables of the injectors 21, 22 and the mediation portions 545*b*, 545*c* for mediating the controlled variables of the fuel pumps 24, 25 integrally and correlating them with each other. As a result, simultaneity in mediation of the controlled variables for the fuel injection is secured thereby achieving an excellent combustion with an excellent fuel-air mixture.

Further, according to the present embodiment, on the controlled variable mediation level 540, the ignition cut mediation portion 543 is provided separately from the ignition timing mediation portion 542 and the injection cut mediation portion 544 is provided separately from the injection function mediation portion 545, thereby accelerating only the speeds of processing of the ignition cut and injection cut mediation portions 543, 544. As a result, processing for fail safe and part protection can be executed rapidly while suppressing an increase of the control arithmetic operation load.

Although the embodiment of the present invention has been described above, the present invention is not restricted to the above-described embodiment, but may be modified within a range not departing from the spirit of the invention. For example, although the above-described embodiment has mentioned three kinds of functions including drivability, exhaust gas and fuel consumption as the fundamental function demand to the engine 1 and these function demands are expressed with three physical quantities such as torque, efficiency and air-fuel ratio and mediated, the present invention is not restricted to this example.

Further, the function demands which are expressed with the controlled variables of the actuators 7, 8, . . . and mediated instead of the three physical quantities are not restricted to the startup, fail safe, part protection, OBD and knocking prevention described in the above-described embodiment. As other function demands, for example, automatic stop of the engine at the time of idle stop and recovery of the performance of the catalyst 17 can be mentioned.

Although according to the above-described embodiment, the signals related to the operating condition and operating state of the engine 1 (common information) are distributed through the common signal distribution system, these signals may be distributed from a higher level to a lower level in the hierarchical structure with the demand values.

Further, the actuators of the engine 1 are not restricted to the igniter 7, the throttle valve 8, the injectors 21, 22 and the fuel pumps 24, 25 of the above-described embodiment. For example, a variable valve timing system (VVT), a variable valve lift system (VVL), and an outside EGR system may be selected as an actuator to be controlled. In an engine with a cylinder stop system or a variable compression ratio system, those systems may be selected as an actuator to be controlled.

In an engine with motor-assisted turbo charger (MAT), the MAT may be selected as an actuator to be controlled. Because the output of the engine 1 can be controlled indirectly with an engine auxiliary device such as an alternator, the auxiliary device may be selected as the actuator to be controlled.

Further, although in the above embodiment, the case in which the electronic control unit of the present invention has been applied to the spark ignition type engine 1 mounted on a vehicle has been described, the present invention may be applied to other engines than the spark ignition type engine 1, for example, a diesel engine or an engine provided in a hybrid system with an electric motor.

What is claimed is:

1. An electronic control unit for an internal combustion engine, comprising:

a processor programmed to:

execute a multilevel hierarchical control program to achieve demands of functions of the internal combustion engine by coordinative control of a plurality of actuators that control an operation of the internal combustion engine, the levels of the multilevel hierarchical control program being defined by single-direction information flow, so that information only flows from a hierarchically higher level to a hierarchically lower level, the multilevel hierarchical control program comprising:

a demand generation level that generates and outputs demand values concerning the functions of the internal combustion engine;

a physical quantity mediation level that is a hierarchically lower level than the demand generation level, the physical quantity mediation level aggregating and mediating demand values expressed with predetermined physical quantities of the demand values output from the demand generation level;

a controlled variable setting level that is a hierarchically lower level than the physical quantity mediation level, the controlled variable setting level setting controlled variables of the plurality of actuators based on the mediated demand values from the physical quantity mediation level; and a controlled variable mediation level that is a hierarchically lower level than the controlled variable setting level, demand values expressed with the controlled variables of the plurality of actuators of the demand values output from the demand generation level being transmitted to the controlled variable mediation level not through the physical quantity mediation level, the controlled variable mediation level aggregating and mediating demand values expressed with the controlled variables of the plurality of actuators set on the controlled variable setting level and the demand values expressed with the controlled variables of the plurality of actuators of the demand values that are transmitted to the controlled variable mediation level not through the physical quantity mediation level for each of the controlled variables;

transmit the demand values output from the demand generation level in a single direction from a higher level to a lower level in order of the demand generation level, the physical quantity mediation level, the controlled variable setting level, and the controlled variable mediation level;

preliminarily set an order of priority on demands of the demand values transmitted from the demand generation level to the controlled variable mediation level not through the physical quantity mediation level, the demands corresponding to a plurality of demands including a startup demand and a fail-safe demand;

mediate the controlled variables of the plurality of actuators based on the order of priority on the controlled variables mediation level;

when the engine is stopped, set a priority order of the startup demand higher than that of the fail-safe demand; and when the engine after startup is running, set a priority order of the fail-safe demand higher than that of the startup demand.

2. The electronic control unit according to claim 1 wherein the demand generation level includes:

a first demand output portion that outputs first express demand values by expressing the demand values of the functions of the internal combustion engine with the predetermined physical quantities of the demand values; and a second demand output portion that outputs second express demand values by expressing the demand values of the functions of the internal combustion engine with values of the controlled variables of the plurality of actuators;

wherein:

the first demand output portion and the second demand output portion are provided for each of the functions of the internal combustion engine;

the physical quantity mediation level includes a physical quantity mediation portion for each of the predetermined physical quantities of the demand values, the physical quantity mediation portion exists for each predetermined physical quantity, and is configured to aggregate the demand values of the predetermined physical quantities, the physical quantity mediation portion being in charge of receiving demand values output from the first demand output portion and mediating the demand values to a single demand value;

the controlled variable setting level adjusts each demand value mediated by the physical quantity mediation portion based on a relationship between respective demand values mediated by each respective physical quantity mediation portion and the setting of the controlled variables for each of the plurality of actuators.

3. The electronic control unit according to claim 1 wherein, the controlled variable mediation level includes an integrated mediation portion, the integrated mediation portion mediating controlled variables of the plurality of actuators integrally by correlating the controlled variables with each other.

4. The electronic control unit according to claim 3 wherein the plurality of actuators include an injector for injecting fuel into the internal combustion engine and a fuel pump for supplying fuel to the injector, and the integrated mediation portion is an injection function mediation portion that mediates controlled variables of the injector and controlled variables of the fuel pump by correlating the controlled variables with each other.

5. The electronic control unit according to claim 4 wherein to stop an operation of the injector, the injection function mediation portion mediates the controlled variables of the fuel pump to stop an operation of the fuel pump by mediating the controlled variables of the injector to stop the operation of the injector.

6. The electronic control unit according to claim 4 wherein the injector injects fuel directly into a combustion chamber in a cylinder of the internal combustion engine and the fuel pump is a high-pressure pump that supplies the injector with fuel with a higher pressure than a predetermined level, and to operate the injector in a compression stroke of the cylinder of the internal combustion engine, the injection function mediation portion mediates the controlled variables of the high-pressure pump to increase a pressure of fuel with the high-pressure pump by mediating the controlled variables of the injector to operate the injector in the compression stroke of the cylinder of the internal combustion engine.

7. The electronic control unit according to claim 1 wherein the plurality of actuators includes an igniter that adjusts an ignition timing of the internal combustion engine, and the controlled variable mediation level includes an ignition timing mediation portion that mediates the ignition timing to be adjusted by the igniter and an ignition cut mediation portion that mediates the controlled variables of the plurality of actuators to stop ignition by the igniter separately from the ignition timing mediation portion.

8. The electronic control unit according to claim 1 wherein the plurality of actuators includes an injector that injects fuel into the internal combustion engine, and the controlled variable mediation level includes an injector control mediation portion that mediates controlled variables of the injector and an injection cut mediation portion that mediates the controlled variables of the injector to stop operation of the injector separately from the injector control mediation portion.

9. A control method of an internal combustion engine for achieving demands of functions of the internal combustion engine by coordinative control of a plurality of actuators that control an operation of the internal combustion engine by an electronic control unit, the control method comprising:

1) generating and outputting demand values concerning the functions of the internal combustion engine on a demand generation level;

2) of the demand values, aggregating and mediating the demand values expressed with predetermined physical quantities on a physical quantity mediation level;

3) setting controlled variables of the plurality of actuators based on the mediated demand values on a controlled variable setting level; and 4) of the demand values output from the demand generation level, aggregating and mediating demand values expressed with the controlled variables of the actuators for each of the controlled variables on a controlled variable mediation level, wherein of the demand values output from the demand generation level, demand values expressed with the controlled variables of the plurality of actuators are transmitted to the controlled variable mediation level not through the physical quantity mediation level;

transmitting the demand values output from the demand generation level in a single direction in order of the steps 1) through 4);

preliminarily setting an order of priority on demands of the demand values transmitted from the demand generation level to the controlled variables mediation level not through the physical quantity mediation level, the demands corresponding to a plurality of demands including a startup demand and a fail-safe demand;

mediating the controlled variables of the actuators based on the order of priority on the controlled variables mediation level;

when the engine is stopped, setting a priority order of the startup demand higher than that of the fail-safe demand; and when the engine after startup is running, setting a priority order of the fail-safe demand higher than that of the startup demand.

* * * * *